(12) United States Patent
White et al.

(10) Patent No.: US 8,091,023 B2
(45) Date of Patent: Jan. 3, 2012

(54) HANDHELD ELECTRONIC DEVICE AND ASSOCIATED METHOD ENABLING SPELL CHECKING IN A TEXT DISAMBIGUATION ENVIRONMENT

(75) Inventors: Shannon Ralph Normand White, Waterloo (CA); Vadim Fux, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1131 days.

(21) Appl. No.: 11/864,013

(22) Filed: Sep. 28, 2007

(65) Prior Publication Data

US 2009/0089665 A1     Apr. 2, 2009

(51) Int. Cl.
*G06F 17/00* (2006.01)

(52) U.S. Cl. .................. 715/257; 715/262; 715/816

(58) Field of Classification Search .......... 715/256–260, 715/810; 345/168
See application file for complete search history.

(56) References Cited

U.S. PATENT DOCUMENTS

| | | | |
|---|---|---|---|
| 6,047,300 A | | 4/2000 | Walfish et al. |
| 2002/0188448 A1 | | 12/2002 | Goodman et al. |
| 2005/0091033 A1 | * | 4/2005 | Valdes et al. .............. 704/5 |
| 2006/0004744 A1 | * | 1/2006 | Nevidomski et al. ........ 707/4 |
| 2008/0133222 A1 | * | 6/2008 | Kogan et al. .............. 704/9 |
| 2008/0189606 A1 | * | 8/2008 | Rybak .................. 715/265 |
| 2010/0180199 A1 | * | 7/2010 | Wu et al. .............. 715/259 |

FOREIGN PATENT DOCUMENTS

EP     1050794 A2     11/2000

OTHER PUBLICATIONS

Toshiyuki Masui "POBox [Predictive cOmposition]: AN Efficient Text Input method for Handheld and Ubiquitous computer" Published by Sony Computer Science Laboratories, Inc—Tokyo, Japan pp. 289-300 dated 1999.*

Kernighan, M., Church, K., Gale, W.: "A Spelling Correction Program Based on a Noisy Channel Model," International Conference on Computational Linguistics, 1990, pp. 205-210, Heslinki, Finland, Retrieved from the Internet: URL:http://portal.acm.org/citation.cfm?id=997975&dl=> [retrieved on Dec. 17, 2007].

K. Kukich, "Techniques for Automatically Correcting Words in Text", ACM Computing Surveys, vol. 24, No. 4, Dec. 1992, XP000646206.

(Continued)

*Primary Examiner* — Quoc A Tran

(74) *Attorney, Agent, or Firm* — Finnegan, Henderson, Farabow, Garrett & Dunner LLP

(57) ABSTRACT

An improved handheld electronic device and associated method enable spell checking in a reduced keyboard and disambiguation environment. The improved spell checking routine converts a misspelled word into a canonical version thereof and receives from a dictionary 42 proposed letter for possible acceptance by the spell checking routine. The spell checking routine advantageously maintains states of various spell check algorithms in order to ensure that no letter is accepted that would require an edit distance of more than one from the misspelled word. The improved spell checking routine advantageously reduces unnecessary processor operation by reducing the extent to which certain portions of the dictionary 42 are searched multiple times during a spell checking operation.

20 Claims, 9 Drawing Sheets

OTHER PUBLICATIONS

"Summons to Attend Oral Proceedings Pursuant to Rule 115(1) EPC," dated Aug. 30, 2010, in European Application No. 07117583.0-1527, filed Sep. 28, 2007 (7 pages).

J.J. Pollock, A. Zamora "Automatic Spelling Correction in Scientific And Scholarly Text," Communications of ACM, 27:4, Apr. 1984 (11 pages).

Kernighan et al., "A Spelling Correcting Program Based On A Noisy Channel Model", International Conference on Computational Linguistics, 2, pp. 205-210, 1990.

Office Action from the Canadian Intellectual Property Office in Application No. 2639765, dated Jun. 1, 2011, 4 pages.

* cited by examiner

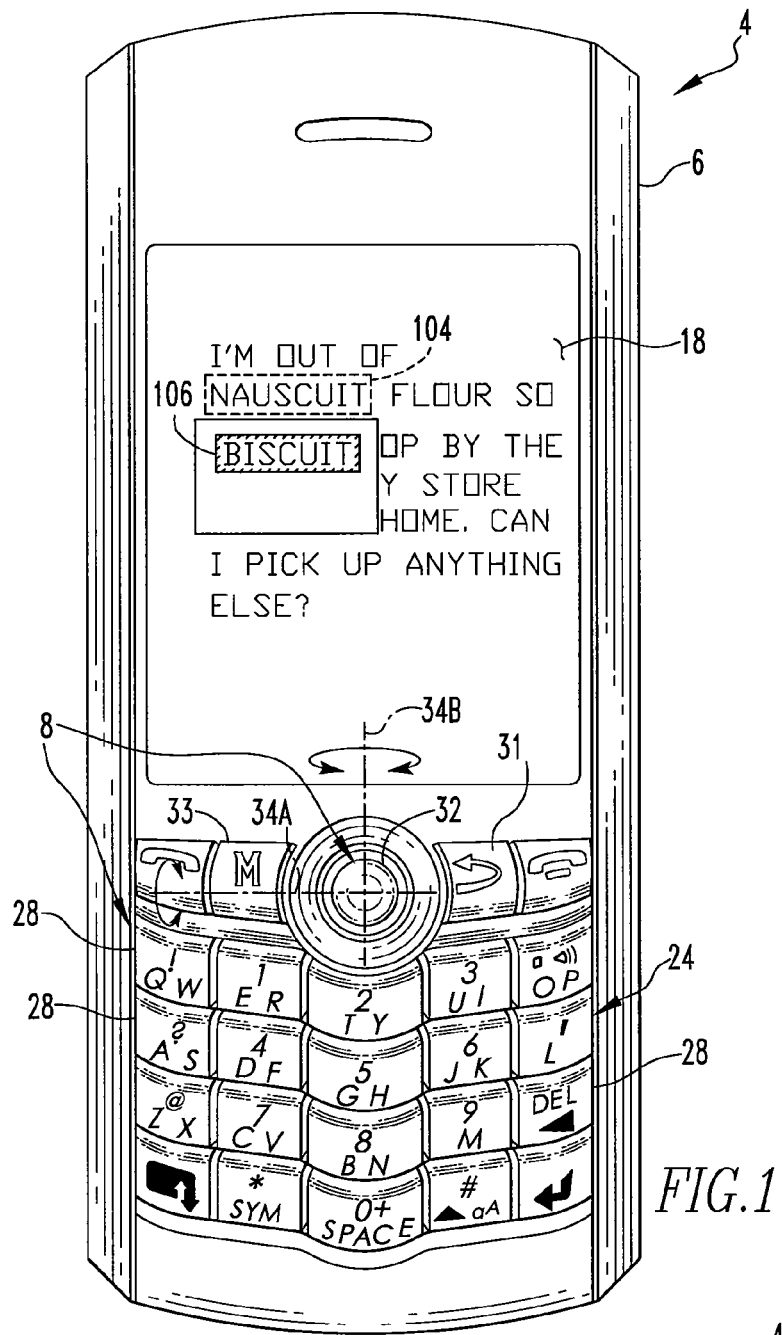
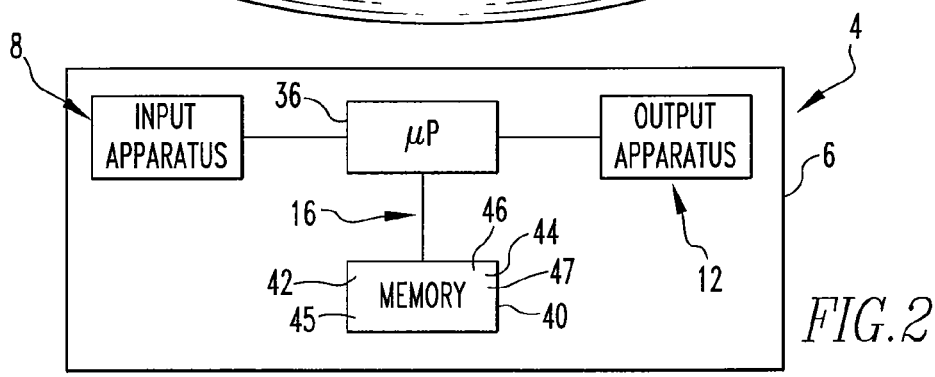

FIG. 4

```
                    112  112  112  112        112
       122           N    A    U    S     C   UI   T
       "ABSCESS" 128 124                  112  112
LETTER A PROPOSED   Z   132  136  140
LETTER A ACCEPTED   IS   R   D    140
LETTER B PROPOSED   IS   R   D    132
LETTER B ACCEPTED 128    I   S    132
LETTER S PROPOSED  132   I   S
LETTER S ACCEPTED       128  I    128
LETTER C PROPOSED        I        128
LETTER C FAILS
```

- ZERO EDIT DISTANCE HAS FAILD
- REPLACE AND DELETE HAVE FAILED
- SWAP HAS FAILED
- REJECT CANDIDATE

```
    "BASICALLY" 122   224
LETTER B PROPOSED   Z
LETTER B ACCEPTED   Z    224
LETTER A PROPOSED   Z    224
LETTER A ACCEPTED   Z
LETTER S PROPOSED   Z
LETTER S ACCEPTED   Z
LETTER I PROPOSED   Z    224
LETTER I ACCEPTED   Z
LETTER C PROPOSED  228   Z   232  236  240
LETTER C ACCEPTED       IS   R    D
LETTER A PROPOSED       IS   R    D
LETTER A ACCEPTED        I   S
LETTER L PROPOSED        I   S
LETTER L FAILS          228       232
```

- ZERO EDIT DISTANCE HAS FAILED
- REPLACE & DELETE HAVE FAILED
- REJECT CANDIDATE

```
   "BISCUIT" 122   324
LETTER B PROPOSED   Z    324
LETTER B ACCEPTED   Z   
LETTER I PROPOSED 328 Z  332  336
LETTER I ACCEPTED   IS   R    D    340
LETTER S PROPOSED   IS   R    D    332  340
LETTER S ACCEPTED 328    I    S    D
LETTER C PROPOSED        I    S    D    340
LETTER C ACCEPTED                  D
LETTER U PROPOSED                  D
LETTER U ACCEPTED                  D
LETTER I PROPOSED                  D
LETTER I ACCEPTED                  D    340
LETTER T PROPOSED                  D
LETTER T ACCEPTED
```

- ZERO EDIT DISTANCE HAS FAILED
- REPLACE HAS FAILED
- INSERT & SWAP HAVE FAILED

END — OUTPUT THE CANDIDATE

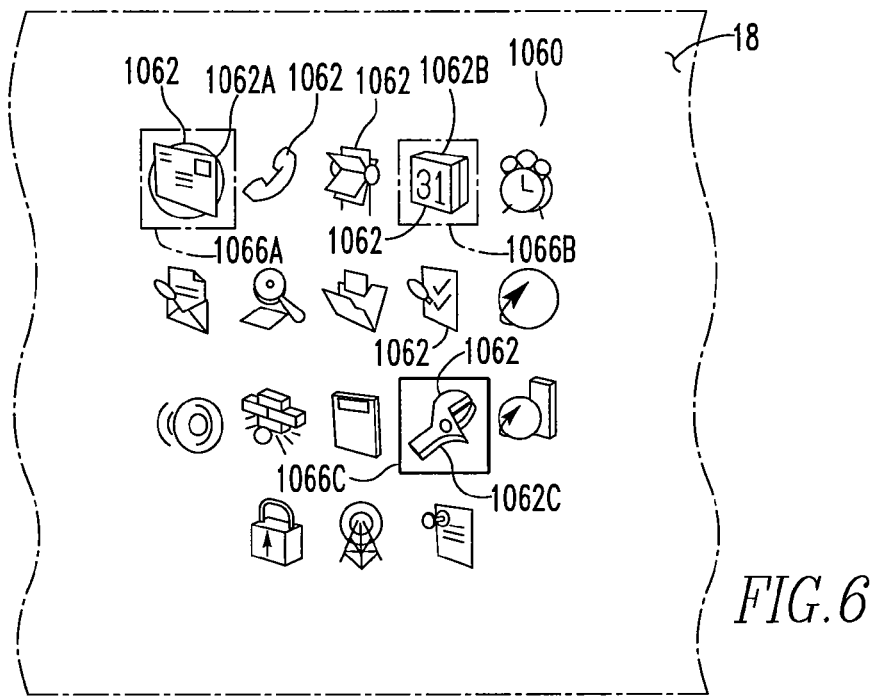
FIG.6
FIG.7
FIG.8
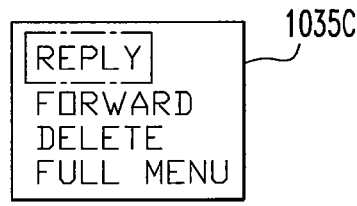
FIG.9

HANDHELD ELECTRONIC DEVICE AND ASSOCIATED METHOD ENABLING SPELL CHECKING IN A TEXT DISAMBIGUATION ENVIRONMENT

BACKGROUND

1. Field

The disclosed and claimed concept relates generally to handheld electronic devices and, more particularly, to a handheld electronic device and method that enable spell checking in a text disambiguation environment.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Certain handheld electronic devices have been configured to have a plurality of characters, i.e., a plurality of Latin letters, assigned to each key and have employed disambiguation software in one form or another to disambiguate ambiguous text input. Such handheld electronic devices have been referred to as having a "reduced" keyboard, and such reduced keyboards and disambiguation software enable a handheld electronic device to have a relatively form factor, i.e., to be physically small. While such devices have been generally effective for their intended purposes, such devices have not, however, been without limitation.

One limitation that exists with reduced keyboards and disambiguation software is in the area of spell checking. Since most any keystroke on a reduced keyboard can refer to any of a plurality of characters, an incorrectly typed word typically will be disambiguated by the disambiguation software in a form quite different than what was originally intended by the user. While efforts have been made to adapt certain spell checking algorithms for use in a disambiguation environment, such efforts have had limited success due to the ambiguity inherent in text input on a reduced keyboard. Moreover, the adaptation of spell checking algorithms to handheld electronic devices has had limited success due to the large processing capacity that typically is consumed by known spell checking algorithms and methodologies. It thus would be desirable to provide an improved spell checking routine and handheld electronic device that overcome these and other limitations.

BRIEF DESCRIPTION OF THE DRAWINGS

A full understanding of the disclosed and claimed concept can be gained from the following Description when read in conjunction with the accompanying drawings in which:

FIG. 1 is a top plan view of an improved handheld electronic device in accordance with the disclosed and claimed concept;

FIG. 2 is a schematic depiction of the improved handheld electronic device of FIG. 1;

FIG. 4 is a chart that diagrams the changing of stored states during an exemplary spell checking process;

FIG. 6 is an exemplary home screen that can be visually output on the handheld electronic device of FIG. 1;

FIG. 7 depicts an exemplary menu that can be output on the handheld electronic device of FIG. 1;

FIG. 8 depicts another exemplary menu;

FIG. 9 depicts an exemplary reduced menu;

Similar numerals refer to similar parts throughout the specification.

DESCRIPTION

Figure 3:
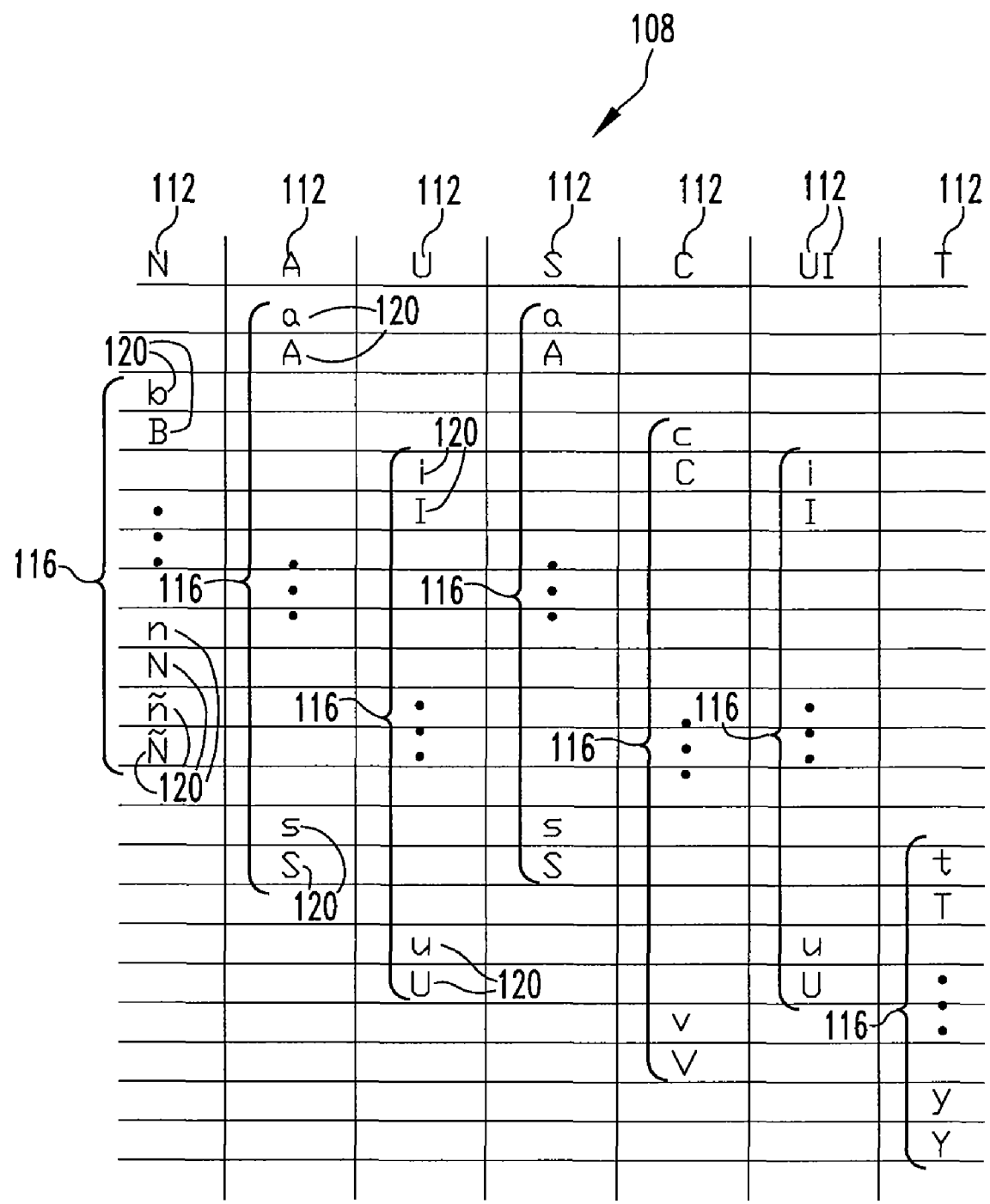
FIG. 3 is a schematic depiction of a data set generated with respect to a word that has been determined to be misspelled.

An improved handheld electronic device 4 is indicated generally in FIG. 1 and is depicted schematically in FIG. 2. The exemplary handheld electronic device 4 includes a housing 6 upon which are disposed an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display 18 that is structured to provide visual output, although other output devices such as speakers, LEDs, tactile output devices, and so forth can be additionally or alternatively used.

As can be understood from FIG. 1, the input apparatus 8 includes a keypad 24 and a multiple-axis input device which, in the exemplary embodiment depicted herein, is a track ball 32 that will be described in greater detail below. The keypad 24 comprises a plurality of keys 28 in the exemplary form of a reduced QWERTY keyboard, meaning that at least some of the keys 28 each have a plurality of linguistic elements assigned thereto, with at least some of the linguistic elements being Latin letters arranged generally in a QWERTY configuration. The keys 28 and the track ball 32 all serve as input members that are actuatable to provide input to the processor apparatus 16. The keypad 24 and the track ball 32 are advantageously disposed adjacent one another on a front face of the housing 6. This enables a user to operate the track ball 32 substantially without moving the user's hands away from the keypad 24 during a text entry operation or other operation.

One of the keys 28 is an <ESCAPE> key 31 which, when actuated, provides to the processor apparatus 16 an input that undoes the action which resulted from the immediately preceding input and/or moves the user to a position logically higher within a logical menu tree managed by a graphical user interface (GUI) routine 46. The function provided by the <ESCAPE> key 31 can be used at any logical location within any portion of the logical menu tree except, perhaps, at a home screen such as is depicted in FIG. 6. The <ESCAPE> key 31 is advantageously disposed adjacent the track ball 32 thereby enabling, for example, an unintended or incorrect input from the track ball 32 to be quickly undone, i.e., reversed, by an actuation of the adjacent <ESCAPE> key 31.

Another of the keys 28 is a <MENU> key 33 which, when actuated, provides to the processor apparatus 16 an input that causes the GUI 46 to generate and output on the display 18 a menu such as is depicted in FIG. 9, which will be discussed in greater detail below. Such a menu is appropriate to the user's current logical location within the logical menu tree, as will be likewise described in greater detail below.

While in the depicted exemplary embodiment the multiple-axis input device is the track ball 32, it is noted that multiple-axis input devices other than the track ball 32 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The track ball 32 is freely rotatable in all directions with respect to the housing 6. A rotation of the track ball 32 a predetermined rotational distance with respect to the housing 6 provides an input to the processor apparatus 16, and such inputs can be employed by a number of routines, for example, as navigational inputs, scrolling inputs, selection inputs, and other inputs. As employed herein, the expression "a number of" and variations thereof shall refer broadly to any non-zero quantity, including a quantity of one.

For instance, and as can be seen in FIG. 1, the track ball 32 is rotatable about a horizontal axis 34A to provide vertical scrolling, navigational, selection, or other inputs. Similarly, the track ball 32 is rotatable about a vertical axis 34B to provide horizontal scrolling, navigational, selection, or other inputs. Since the track ball 32 is freely rotatable with respect to the housing 6, the track ball 32 is additionally rotatable about any other axis (not expressly depicted herein) that lies within the plane of the page of FIG. 1 or that extends out of the plane of the page of FIG. 1.

The track ball 32 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 32 is merely one of many multiple-axis input devices that could be employed on the handheld electronic device 4. As such, mechanical alternatives to the track ball 32, such as a joystick, might have a limited rotation with respect to the housing 6, and non-mechanical alternatives might be immovable with respect to the housing 6, yet all are capable of providing input in a plurality of directions and/or along a plurality of axes.

The track ball 32 additionally is translatable toward the housing 6, i.e., into the plane of the page of FIG. 1, to provide additional inputs. The track ball 32 could be translated in such a fashion by, for example, a user applying an actuating force to the track ball 32 in a direction toward the housing 6, such as by pressing on the track ball 32. The inputs that are provided to the processor apparatus 16 as a result of a translation of the track ball 32 in the indicated fashion can be employed by the routines, for example, as selection inputs, delimiter inputs, or other inputs.

As can be seen in FIG. 2, the processor apparatus 16 comprises a processor 36 and a memory 40. The processor 36 may be, for instance and without limitation, a microprocessor (μP) that is responsive to inputs from the input apparatus 8 and that provides output signals to the output apparatus 12. The processor 36 interfaces with the memory 40.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein the aforementioned number of routines which are executable on the processor 36. The routines can be in any of a variety of forms such as, without limitation, software, firmware, and the like. As will be explained in greater detail below, the routines include a spell checking routine 44, a disambiguation routine 45, and the aforementioned GUI 46, as well as other routines.

The memory 40 additionally has a dictionary 42 and a keyboard mapping table 47 stored therein. The dictionary 42 has a plurality of words stored therein that can be accessed in one fashion or another by the disambiguation routine 45 and the spell checking routine 44 for purposes such as the disambiguation of ambiguous text input and the identification of proposed spelling corrections in the event of a misspelled word. The dictionary 42 comprises a plurality of separately selectable dictionaries that are each tailored to a different specific language. For instance, the dictionary 42 comprises an English dictionary and a French dictionary, and could include additional and/or alternative language dictionaries. The user can select between the English dictionary and the French dictionary in any of a variety of ways, including as set forth below. At any given time, for example, the operative language on the handheld electronic device 4 will be the language of the currently selected dictionary, i.e., either English or French, meaning that the spell checking routine 44 and the disambiguation routine 45 will seek data from the currently selected dictionary in performing their functions. Responsive to a selection of an alternate language dictionary, such as when the currently selected dictionary is the English dictionary and the user selects the French dictionary, the operative language on the handheld electronic device 4 will be changed to the language of the alternate language dictionary, i.e., French, meaning that the spell checking routine 44 and the disambiguation routine 45 will seek data from the alternate language dictionary in performing their functions The dictionary 42 can have any of a variety of data arrangements and is configured to perform callback operations that request data or provide data, for example, and that can be detected and responded to by the spell checking routine 44. In some situations, for instance, and depending upon the data arrangement of the dictionary 42, the dictionary might perform one or more callback operations asking the spell checking routine 44 to provide some suggestions as to which letters might be valid as first, second, and/or third letters in a proposed spelling correction. In other situations, the dictionary 42 might perform callback operations asking the spell checking routine 44 whether or not a given letter would be an acceptable character at a particular position within a possible spelling correction of a misspelled word.

In the exemplary embodiment described herein, the dictionary 42 has a data arrangement that comprises a plurality of data tables that are organized according to the first two letters of the words that are stored therein. For instance, all of the words beginning with "ab" would be stored in an "AB" table. In the event a table such as the "AB" table has two hundred fifty-six (256) or fewer words stored therein, the words are all stored in a "leaf node". However, if more than two hundred fifty-six words begin with the same two letters, the data structure will include both internal nodes and leaf nodes. For example, "AB" might be an internal node, and "ABS" and "ABO" might be leaf nodes that depend from the "AB" node and would be the location where the words beginning with "abs" and "abo," respectively, are themselves stored. Moreover, the word "abolish," for example, would actually be stored at the "ABO" node as "lish," i.e., each word stored at a node is represented by only those letters of the word that are additional to the letters of the node. As will be explained in greater detail below, the spell checking routine 44 also has a RECALL feature that relies upon the storage of a pointer which points to various nodes during the spell checking operation and that can recall a previous state, i.e., a previous node, upon a spell checking failure or other condition at a current node.

Since the words in the exemplary dictionary 42 are arranged in tables according to the first two letters of the words, words typically cannot be identified in the dictionary 42 until at least a first two characters are identified. For example, the word "abide" cannot be identified until the "AB" table itself is identified, and thereafter the word "abide" would be represented by the terminal letters "ide". Therefore, the exemplary dictionary 42 might be required to perform a number of callback operations requesting that the spell checking routine 44 provide some guidance as to which word tables might reasonable be consulted for proposed spelling corrections.

For example, the dictionary 42 might perform a first callback operation asking the spell checking routine 44 to provide a list of letters that would each be acceptable by the spell checking routine 44 as a first letter in a proposed spelling correction. In response thereto, the spell checking routine 44 might return to the dictionary 42 a list of characters that would each be appropriate in a first position within a possible spelling correction for a misspelled word. The dictionary 42 might then select a particular one of these returned letters, such as the letter "A," and perform a second callback operation asking the spell checking routine 44 to accept the particular letter as a first letter. Since the particular letter had been brought to the attention of the dictionary 42 because it had been proposed by the spell checking routine 44, the spell checking routine 44 would almost certainly accept the particular letter, i.e., the letter "A," as a first letter.

The dictionary might then perform a third callback operation asking the spell checking routine 44 to provide a list of letters that would each be acceptable as a second letter in a proposed spelling correction given that the spell checking routine 44 has already accepted the particular letter as a first letter. In response thereto, the spell checking routine 44 might return to the dictionary 42 a list of characters that would each be an appropriate second letter given the particular letter as a first letter. The dictionary 42 might then select a specific one of these returned second letters, such as the letter "B," and would perform a fourth callback operation to the spell checking routine 44 asking the spell checking routine 44 to accept the specific letter as a second letter in a proposed spelling correction. Again, since the specific letter had been brought to the attention of the dictionary 42 because it had been proposed by the spell checking routine 44 as a valid second letter, the spell checking routine 44 would almost certainly accept the particular letter, i.e., the letter "B," as a second letter.

At this point, therefore, the dictionary 42 could use the particular letter and the specific letter, i.e., the letters "AB," to identify a word table, i.e., the "AB" word table. Thereafter, words in the identified word table can be provided on a letter-by-letter basis to the spell checking routine 44 for evaluation as possible spelling corrections.

On the other hand, and in an alternative embodiment, the dictionary might instead have a data arrangement similar to a convention book-type dictionary wherein the dictionary merely contains a list of words, with the list starting with words that begin with A and ending with words that begin with Z. Such an alternative dictionary likely would perform no such callback operations requesting proposed first and second letters from the spell checking routine 44. Rather, the dictionary likely would simply begin with the first word in its list as a candidate spelling correction and would perform callback operations requesting that the spell checking operation accept each letter of the first word. If at any point the spell checking routine 44 would refuse to accept a letter proposed by the dictionary, the current candidate spelling correction would fail, and the dictionary would continue to the next word in the list and so on through the end of its list. In such a situation, therefore, such a dictionary would not perform the aforementioned first and third callback operations wherein the spell checking routine 44 was requested to identify valid first and second letters. However, the use of such a dictionary potentially could consume processor resource in an inefficient fashion.

The exemplary dictionary 42 and spell checking routine 44 advantageously are able to cooperate with one another independent of the specific configurations thereof. As will be set forth in greater detail below, the dictionary 42 performs callback operations sending to the spell checking routine 44 proposed letters of candidate spelling corrections. The spell checking routine 44 responds to the dictionary 42 indicating whether or not such letters are accepted. Also, and as mentioned above, the dictionary 42 may at certain times perform callback operations that request the spell checking routine 44 to provide lists of possible valid characters, and in response the spell checking routine 44 would provide such lists of possible valid characters. As such, a dictionary 42 configured differently than that described above can be used in conjunction with the spell checking routine 44 so long as the dictionary 42 is configured to perform callback operations that are cooperable with the spell checking routine 44. Similarly, the spell checking routine 44 can advantageously be configured in fashions other than described herein so long as the spell checking routine 44 is capable of receiving callback operations from a dictionary 42 and providing responses thereto. In this regard, it is noted that the operation of the spell checking routine 44 as described herein is merely one implementation of the disclosed and claimed concept, and it is therefore not intended to be limiting of the disclosed and claimed concept.

The keyboard mapping table 47 comprises for each key 28 of the keypad 24 the various characters that are assigned thereto. For example, the key 28 to which the letters "U" and "I" are assigned would have assigned thereto these two Latin letters in all of their upper case, lower case, diacritical, and non-diacritical forms. The keyboard mapping table 47 is consulted whenever a word is identified as being misspelled in order to generate a data set 108 for the misspelled word and to thereby enable operation of the spell checking routine 44, as will be described in greater detail below.

Whenever the spell checking routine 44 is initiated with respect to a quantity of text, the spell checking routine checks each word to determine whether or not it is found in the dictionary 42. If any word cannot be found in the dictionary 42, the word is determined to be misspelled, and the spell checking routine 44 operates seeking to identify one or more proposed spelling corrections 106 that could be used to replace the misspelled word. A new word that is not already stored in the dictionary 42 might be identified by the spell checking routine 44 as being misspelled despite the new word actually being correctly entered. That is, a determination by the spell checking routine 44 that a word is misspelled could be considered to be a determination that the word is at least potentially misspelled but potentially might be correctly spelled and new to the dictionary 42.

The spell checking routine 44 advantageously is configured to enable the correction of erroneous inputs, even those that have resulted in misspellings that vary greatly from the intended input. Such misspellings can regularly occur with reduced keyboards such as the keypad 24, although it is expressly noted that the spell checking routine 44 can advantageously be applied in conjunction with input from a full keyboard, as will be set forth in greater detail below. With reduced keyboards, for example, the typing of certain words requires the inputting of a key sequence that includes two, three, or even four sequential actuations of the same key, such as in the way the typing of the word "there" using the keypad 24 would require three sequential actuations of the key 28 <ER>. Oftentimes a user might actuate such a key 28 too few times or too many times. In either situation, and in the absence of the spell checking routine 44, a proposed disambiguation of the input might be quite different from what was intended by the user.

For example, and as is set forth in FIG. 1, the display 18 has output thereon the misspelled word "NAUSCUIT" as is indicated with the highlight 104, and additionally has output thereon a proposed spelling correction 106 "BISCUIT" that was generated through operation of the spell checking routine 44. The exemplary misspelled word "NAUSCUIT" may have been the result of an attempt by a user to type "BISCUIT", with the user inadvertently typing an additional <AS> after typing <BN>. For instance, when the misspelled word was initially being typed the disambiguation routine 45 might have proposed "NAU" as a proposed disambiguation of the initial three keystrokes <BN> <AS> <UI> based upon the first three letters of the word "nautical" in the dictionary 42. However, when the fourth keystroke <AS> was entered, the dictionary 42 likely contained no word that corresponded with the keystroke sequence <BN> <AS> <UI> <AS>, and thus "NAU" was retained, and "S" for the fourth keystroke was appended thereto, thus "NAUS". The "S" might have been selected for the fourth keystroke in favor of "A" for any of a variety of reasons. For instance, in a situation wherein no word corresponds with an input, the disambiguation routine 45 might try to identify in the memory 40 one or more strings of two or three letters each that match a terminal two or three keystrokes of the input. By way of example, it might have been determined that the three character string "AUS" was stored in the memory 40 and was preferred to the string "AUA" that was similarly stored in the memory 40. Alternatively, it might have been determined that the three character string "AUS" was stored in the memory 40 but that no string "AUA" existed in the memory 40. Still alternatively, it might have been determined that neither "AUS" nor "AUA" existed as stored strings in the memory 40, but that "US" and "UA" were found in the memory 40 and that "US" was preferred. Any such situation would have resulted in a preference of "S" as the fourth character. Further keystrokes would have been interpreted in a similar fashion until the input was delimited, thus leaving the exemplary misspelled word "NAUSCUIT" as the final result.

FIG. 1 depicts the spell checking routine 44 having already been initiated, either automatically or though some operation by the user, with the spell checking routine 44 having determined that the word "NAUSCUIT" was not found in the dictionary 42 and therefore was misspelled. Therefore, the spell checking routine 44 performed operations such as those that will be described in greater detail below in order to generate the proposed spelling correction 106 "BISCUIT".

Upon the identification of a misspelled word, the spell checking routine 44 generates the aforementioned data set 108 that can be seen in FIG. 3 and that serves as a canonical version of the misspelled word. The data set 108, i.e., the canonical version of the misspelled word, is generated by first reducing the misspelled word to its canonicalized form by collapsing together any adjacent characters of the misspelled word that are assigned to the same key 28. In the present example, i.e., in the misspelled word "NAUSCUIT", the letters "U" and "I" that are adjacent one another are both assigned to the same key 28 and thus are collapsed together as a single entry in the canonicalized form of the misspelled word. Specifically, the canonicalized form of the misspelled word "NAUSCUIT" can be represented by the string of seven data elements: <BN> <AS> <UI> <AS> <CV> <UI> <TY>. That is, the initial letter "N" in "NAUSCUIT" is represented by the single data element <BN> which, in canonicalized form, refers to any quantity of sequential actuations of the key 28 to which "B" and "N" are assigned. Similarly, the "U" and "I" that are adjacent one another in "NAUSCUIT" are collapsed into a single data element <UI> that similarly can refer to any number of sequential actuations of the key 28 to which "U" and "I" are assigned.

The canonical version, i.e., the data set 108, of the canonicalized form <BN> <AS> <UI> <AS> <CV> <UI> <TY> of the misspelled word "NAUSCUIT" is created by consulting the keyboard mapping table 47. In so doing, for any character 112 of the misspelled word, and more specifically for any element such as <BN> of the canonicalized form of the misspelled word, all of the characters 120 that are equivalent thereto are identified and are arranged in a character set 116. The various character sets 116 together form the data set 108 of the misspelled word. In the present example, the data set 108 is in the exemplary form of a table, with each character set 116 being a virtual column in the data set 108 table. For example, the leftmost column, i.e., the first column, in the data set 108 corresponds with the character 112 "N" of the misspelled word "NAUSCUIT" and, more specifically, with the element <BN> of the canonicalized form of the misspelled word, and therefore includes a character set 116 that comprises as equivalent characters 120 the letters "b", "B", "n", "N", "ñ", and "Ñ", by way of example. That is, each of these characters 120 is considered to be equivalent to each other such character 120 in the character set 116. Other characters might be assigned to the key 28 to which "B" and "N" are assigned, and such equivalent characters 120 would be comprised within the character set 116 of the first column of the data set 108, although for the sake of simplicity any such additional equivalent characters are not expressly depicted in FIG. 3.

By way of further example, the third column of the data set 108 is the character set 116 for the first instance of the letter "U" of the misspelled word "NAUSCUIT". It is understood that many different diacritical forms of upper case and lower case versions of "I" and "U" are assigned to the same key 28. Such various diacritical forms of upper case and lower case versions of the letters "I" and "U" would therefore be comprised within the character set 116, although they are not expressly depicted in FIG. 3 for purposes of simplicity.

Once a canonical version of a misspelled word in the form of a data set 108 is generated, as is depicted in an exemplary form in FIG. 3, the spell checking routine 44 can interact with the dictionary 42 to identify words stored in the dictionary 42 that can be output as proposed spelling corrections of the misspelled word. In the present example, the proposed spelling corrections that are identified for possible output on the display 18 are limited to those determined to have a canonical edit distance of at most one from the misspelled word. A canonical edit distance between a misspelled word and a proposed spelling correction is not necessarily the same as an actual edit distance between the misspelled word and the proposed spelling correction, and it is noted that the actual edit distance can be greater than the canonical edit distance.

When determining whether or not a candidate spelling correction is within a canonical edit distance of one of a misspelled word, incorrect numbers of sequential actuations of the same key 28 and exchanges of characters for equivalent characters are advantageously ignored. Such incorrect numbers of sequential actuations of the same key 28 and exchanges of characters for equivalent characters likely would, however, contribute to the determination of an actual edit distance between a misspelled word and a proposed spelling correction. While in the exemplary embodiment described herein the proposed spelling corrections are limited to words within a canonical edit distance of one from a misspelled word, it is understood that in other embodiments canonical edit distances of greater than one can be employed without departing from the present concept.

The four conventional spell check algorithms INSERT, SWAP, REPLACE, and DELETE each contribute to the determination of the canonical edit distance between a misspelled word and a candidate spelling correction. The INSERT spell check algorithm operates essentially according to the principle that any character in the alphabet can be inserted in front of any character in a misspelled word, or behind such a character in a misspelled word, and any single such insertion will constitute a canonical edit distance of one from the misspelled word. The SWAP spell check algorithm operates essentially according to the principle that any two adjacent characters in a misspelled word can be swapped with one another, and any single such swap constitutes a canonical edit distance one from the misspelled word. The REPLACE spell check algorithm operates essentially according to the principle that any given character in a misspelled word can be replaced with another character, and any single such replacement will constitute a canonical edit distance of one from the misspelled word. The DELETE algorithm operates essentially according to the principle that any character in a misspelled word can be deleted, and any single such deletion constitutes a canonical edit distance of one from the misspelled word. Thus, if the difference between a misspelled word and a candidate spelling correction is a single swap, the canonical edit distance between the misspelled word and the candidate spelling correction is a canonical edit distance of one. However, if the difference between the misspelled word and the candidate spelling correction includes more than one instance of one of the spell check algorithms, or requires the application of more than one spell check algorithm, the misspelled word and the candidate spelling correction will be at a canonical edit distance of two or more.

It is reiterated, however, that proposed spelling corrections are identified in the dictionary 42 based upon a comparison of a word in the dictionary 42 with a canonical version of the misspelled word, i.e., the data set 108, which is a comparison based upon a canonical edit distance. Thus, operations such as insertions, swaps, replacements, and deletions of characters that are considered to be equivalents of certain other characters and/or that could be resolved into a change in the number of sequential actuation of a given key will not contribute to the canonical edit distance between the misspelled word and the candidate spelling correction, i.e., for purposes of determining whether the canonical edit distance therebetween is no more than an edit distance of one. The conversion of a misspelled word into a canonical version thereof, such as with the data set 108, advantageously enables the spell checking routine 44 to employ a canonical edit distance in identifying proposed spelling corrections, rather than being limited to actual edit distances. The employing of the canonical edit distance therefore overcomes many of the obstacles inherent in text entry on a reduced keyboard by ignoring changes between characters that are equivalent to one another and by ignoring incorrect numbers of sequential actuations of any given key 28.

The spell checking operation is described below as beginning with the dictionary 42 identifying a word stored therein as being a candidate spelling correction and performing a number of callback operations to the spell checking routine 44. During such callback operations, the letters in the candidate spelling correction are sent on a letter-by-letter basis from the dictionary 42 and are received by the spell checking routine 44 for comparison with the data set 108 and for possible acceptance of such letters. As mentioned above, however, and depending upon the data structure employed, the dictionary 42 may additionally perform other callback operations that are required by the specific data arrangement of the dictionary.

For example, and as likewise set forth above, the specific data arrangement of the dictionary 42 requires that at certain times the dictionary 42 initially perform a number of callback operations wherein the dictionary 42 requests that the spell checking routine 44 identify one or more letters that would be acceptable at a first position and a second position in a proposed spelling correction. In response to each list of letters from the spell checking routine 44, the dictionary 42 would propose to the spell checking routine 44 one of these letters for acceptance as a first letter or as a second letter. It is upon acceptance of these first two letters by the spell checking algorithm 44 that the dictionary 42 can identify a word table and can therefore identify words in the word table. That is, prior to identifying in the dictionary 42 any candidate spelling corrections, the dictionary 42 is in certain circumstances required to perform one or more callback operations asking the spell checking routine 44 to provide some initial direction to the dictionary 42 by supplying the characters that could be valid in a first position of a proposed spelling correction, a second position of a proposed spelling correction, and possibly a third position of a proposed spelling correction, etc.

Such callback operations that might be performed by the dictionary 42 are related to its specific data arrangement wherein words are stored in tables according to the first two letters of the word. As mentioned above, any data arrangement can be employed in the dictionary 42 so long as it is capable of proposing letters to the spell checking routine 44 and receiving from the spell checking routine 44 indications of whether the letters are accepted or rejected. Since these callback operations such as the first and third callback operations mentioned above are specific to the particular data arrangement of the dictionary 42, for the sake of simplicity such callback operations are not exhaustively described hereinafter. That is, to the extent the dictionary 42 might occasionally request some initial guidance from the spell checking routine 44, such requests are not exhaustively identified or described hereinafter, although they may nevertheless occur depending upon the arrangement of the word data in the dictionary 42. The same can be said of other callback operations that might be performed by other dictionaries based upon their specific data arrangements. As a general matter, therefore, the discussion hereinafter regarding the interactions between the dictionary 42 and the spell checking routine 44 will largely focus on the proposal of letters by the dictionary 42 performed via callback operation and the acceptance or rejection of such proposed letters by the spell checking routine 44, such as in the second and fourth callback operations mentioned above. That is, the discussion herein after will focus on the proposal of letters by the dictionary 42 and will not exhaustively address whether any given letter might have been identified by the dictionary 42 based on its being initially suggested by the spell checking routine 44, or whether it was identified by the dictionary 42 based on its being a next consecutive letter of a candidate spelling correction.

By way of example, the dictionary 42 might, in one callback operation, requesting the spell checking routine 44 to accept a letter in a first position, such as the letter "A". If the proposed letter "A" is already contained within the character set 116 of the first column of the data set 108, the letter "A" can be accepted by the spell checking routine 44 as being at a canonical edit distance of zero from the misspelled word.

However, in the current example the letter "A" is not contained within the character set 116 associated with the character 112 "N" of the misspelled word "NAUSCUIT". Rather, that character set 116 comprises the upper case, lower case, diacritical, and non-diacritical forms of "B" and "N". As such, the INSERT, SWAP, REPLACE, and DELETE algorithms will need to be consulted to determine whether or not the proposed letter "A" would be acceptable within a canonical edit distance of one as to each of the algorithms.

For instance, according to the INSERT algorithm the letter "A" could be inserted in front of the letter "N" of the misspelled word "NAUSCUIT" at a canonical edit distance of one at this point from the misspelled word. Similarly, the SWAP algorithm could determine that "A" is the second character in the misspelled word "NAUSCUIT" and that a swap operation between the adjacent letters "N" and "A" would result in the letter "A" being a first character, and with such an operation being within a canonical edit distance of one at this point from the misspelled word. According to the REPLACE algorithm, the letter "N" could be replaced with the "A" within a canonical edit distance of one from the misspelled word at this point. According to the DELETE algorithm, the letter "N" could be deleted, thereby leaving the letter "A" of "NAUSCUIT" as the first character of a proposed spelling correction within a canonical edit distance of one at this point from the misspelled word.

Accordingly, all four of the aforementioned spell check algorithms would consider the letter "A" to be a valid first character of a hypothetical proposed spelling correction that would be within a canonical edit distance of one from the misspelled word "NAUSCUIT". The letter "A" would therefore be accepted as a first letter by the spell checking routine 44. It is noted, however, that all four of the spell check algorithms are, upon the acceptance of "A" as a proposed first character, already at a canonical edit distance of one. As such, any word that begins with the letter "A" that is proposed by the dictionary 42 as a spelling correction will be invalid if it requires any additional operations of the four spell check algorithms. This is because the further operation of such spell check algorithms would increase the canonical edit distance from the present value of one to a value of two or more which, in the present exemplary embodiment, is an invalid canonical edit distance. Accordingly, any word that begins with "A" and that is proposed by the dictionary 42 as a candidate spelling correction already varies, as at the letter "A", from the misspelled word "NAUSCUIT" by a canonical edit distance of one, and thus any such proposed spelling correction from the dictionary 42 would have to correspond with a remaining portion of the canonical version of the misspelled word "NAUSCUIT" without any additional uses of any of the four spell check algorithms.

Each spell check algorithm employs different logic, such as the differing logic used by each spell check algorithm in accepting the letter "A" above as a valid first character of a proposed spelling correction. Such differing logic must somehow be remembered by the spell checking routine 44 in order to ensure that additional letters of a candidate spelling correction that are received from the dictionary 42 conform with the logic of the various spell check algorithms and do not require further operations of any of the spell check algorithms. For instance, in the present example the SWAP spell check algorithm accepted the letter "A" as a first letter based upon an assumption that the letters "N" and "A" "NAUSCUIT" could be swapped with one another. This means that the SWAP spell check algorithm accepted "A" as a first letter based upon an assumption that "N" will be received from the dictionary 42 as a proposed second letter. If the second letter proposed by the dictionary 42 is neither "N" nor an equivalent thereto, the assumption of the SWAP spell check algorithm that served as the basis upon which it accepted "A" as a first letter will not have been borne out, and the SWAP spell check algorithm will therefore fail as being invalid with respect to the current candidate spelling correction.

In accordance with the disclosed and claimed concept, the spell checking algorithm 44 advantageously remembers the logic employed by the spell check algorithms by maintaining a state for each valid spell check algorithm. That is, with the acceptance of each letter from the dictionary 42, the spell checking routine 44 maintains and stores a state value for each valid spell check algorithm. If a letter proposed by the dictionary 42 causes a spell check algorithm to become invalid, that spell check algorithm is ignored until the next candidate spelling correction is identified by the dictionary 42, at which point the spell check algorithms will all be reset and the dictionary 42 will begin proposing the letters of such next candidate spelling correction for possible acceptance by the spell checking routine 44.

FIG. 4 depicts several examples of the stored and changing states of the various spell check algorithms when seeking to identify proposed spelling corrections for the misspelled word "NAUSCUIT". In one example, the dictionary 42 has identified as a candidate spelling correction 122 the word "ABSCESS" and will sequentially send to the spell checking routine 44 the letters in the word "ABSCESS" for acceptance by the spell checking routine 44. As suggested above, the dictionary 42 may have also performed operations such as the aforementioned first and third callback operations to the spell checking routine 44 in order to receive from the spell checking routine 44 the letters "A" and "B" as valid first and second letters, which would enable the dictionary 42 to identify its "AB" word table and would thereby enable the identification by the dictionary 42 of "ABSCESS" as a candidate spelling correction.

As a general matter, if the spell checking routine 44 accepts all of the letters of a candidate spelling correction 122 from the dictionary 42 and both the candidate spelling correction 122 and the data set 108 are at their ends, i.e., each at their terminal character or position, the candidate spelling correction 122 is sent to an output file for possible outputting as a proposed spelling correction 106. However, if any letter is rejected, the candidate spelling correction 122 fails, i.e., it is rejected by the spell checking routine 44, and the dictionary 42 will thereafter typically identify another candidate spelling correction and will begin sending its letters to the spell checking routine 44 for possible acceptance.

Each state can be said to represent or can be said to point to a character set 116 that must contain an equivalent of an incoming letter from the dictionary 42 in order for the incoming letter to be accepted and for the state to remain valid. FIG. 4 depicts the various states of the spell checking routine 44 at the time each letter is proposed by the dictionary 42 and also at the time the letter is accepted or rejected by the spell checking routine 44.

It is noted that for the sake of clarity the headings of the columns of the data set 108 in FIG. 4 are depicted as being the characters 112 of "NAUSCUIT," but it is also noted that these depicted characters 112 are intended to refer to the canonicalized form of the misspelled word "NAUSCUIT". These column headings could therefore be more precisely referred to as being the data elements <BN>, <AS>, <UI>, <AS>, <CV>, <UI>, and <TY>, each of which is associated with its own character set 116. However, in order to simplify the presentation of the concept herein, the analysis is described in terms of correcting the spelling of "NAUSCUIT", and therefore the column headings are depicted as being the characters 112 of the misspelled word, and the character sets 116 are described as being associated with the characters 112 of the misspelled word.

At the time the letter "A" is being proposed, the spell checking routine 44 will have already stored a zero edit distance state 124 that refers to a canonical edit distance of zero and that is pointing to the character set 116 associated with the character 112 "N" of the misspelled word "NAUSCUIT". That is, prior to the acceptance of any letters, the zero edit distance state 124 points to the character set 116 of the first column, which signifies that if the first letter received from the dictionary 42 is contained somewhere within the character set 116 of the first column, the first letter received from the dictionary 42 can be accepted by the spell checking routine 44 while still maintaining a canonical edit distance of zero at this point from the misspelled word "NAUSCUIT". In the current example, however, the first letter that is being proposed by the dictionary 42 is the letter "A," which also happens to be the first letter of the exemplary candidate spelling correction 122 "ABSCESS". Since the character set 116 of the first column comprises upper case, lower case, diacritical, and non-diacritical forms of the letters "B" and "N" and does not comprise and form of the letter "A", the letter "A" cannot be accepted by the spell checking routine 44 as a first character while still maintaining a canonical edit distance of zero from the misspelled word "NAUSCUIT". On the other hand, and as set forth above, the spell check algorithms INSERT, SWAP, REPLACE, and DELETE can accept "A" as a first character of a proposed spelling correction for the misspelled "NAUSCUIT", but in order to do so all four of the spell check algorithms will then be at a canonical edit distance of one.

As can be seen in FIG. 4, therefore, upon acceptance of the letter "A" of "ABSCESS," the zero edit distance state 124 has failed, but an INSERT algorithm state 128 and a SWAP algorithm state 132 are indicated as pointing to the character set 116 associated with the character 112 "N" of the data set 108, a REPLACE algorithm state 136 is indicated as pointing to the character set 116 associated with the character 112 "A" of the data set 108, and a DELETE algorithm state 140 is indicated as pointing at the character set 116 associated with the character 112 "U" of the data set 108. Upon acceptance of the letter "A", therefore, all four of the spell check algorithms remain viable, but each is already at a canonical edit distance of one from the misspelled word "NAUSCUIT".

The states 128, 132, 136, and 140 are stored by the spell checking routine 44 in order to determine whether future letters that will be proposed by the dictionary 42 can be accepted by the spell checking routine 44 as to at least one of the spell check algorithms without requiring an additional canonical edit distance. The states 128, 132, 136, and 140 are indicative of the fact that the four spell check algorithms are each already at a canonical edit distance of one, and any future letters that are proposed by the dictionary 42 cannot be accepted if they would require an additional canonical edit distance since it is desired to identify only those candidate spelling corrections having at most a canonical edit distance of one from the misspelled word.

As a general matter, the states 128, 132, 136, and 140 can be said to refer to the character sets 116 within which the next letter received from the dictionary 42 must be found in order to avoid having a spell check algorithm fail and thus be removed from further consideration, i.e., disregarded or ignored, by the spell checking routine 44. That is, each spell check algorithm that is viable, i.e., has not yet failed, has associated therewith a stored state that points to one of the character sets 116, and if the next letter proposed by the dictionary 42 cannot be found in that character set 116 the spell check algorithm fails. If all of the spell check algorithms fail, the candidate spelling correction that is being considered fails, and the dictionary 42 finds another candidate spelling correction and begins to send its letters for possible acceptance by the spell checking routine 44.

Returning to FIG. 4, it can be seen that upon acceptance by the spell checking routine 44 of the letter "A", the dictionary 42 proposes the letter "B" as a second letter in a proposed spelling correction for possible acceptance by the spell checking routine 44. It can also be seen from FIG. 4 that the various states 128, 132, 136, and 140 have not changed between acceptance of the letter "A" and the proposal of the second letter "B". As such, at the time the letter "B" is proposed, it can be accepted by the INSERT algorithm and the SWAP algorithm if the letter "B" is found in the character set 116 associated with the character 112 "N" of the data set 108. Since the proposed letter "B" is found in this character set 116, the proposed letter "B" is accepted by the spell checking routine 44 as to the INSERT algorithm and the SWAP algorithm, and the INSERT algorithm state 128 and the SWAP algorithm state 132 are changed. That is, upon acceptance of the letter "B," the INSERT algorithm state 128 is shifted one position to point to the character set 116 associated with the character 112 "A" of the data set 108. On the other hand, the SWAP algorithm state 132 is shifted two positions to point to the character set 116 associated with the character 112 "U" of the data set 108.

This disparate shifting is the logical result of the principles underpinning the INSERT algorithm and the SWAP algorithm. For example, the INSERT algorithm accepted the letter "A" on the basis of it being hypothetically inserted in front of the letter "N" as a first character in a proposed spelling correction, and the INSERT algorithm further accepted the letter "B" as a second character since it was found in the character set 116 for the character 112 "N", i.e., the letter "B" was essentially determined to be equivalent to the character 112 "N" of the misspelled word "NAUSCUIT". As such, and having accepted the letters "AB" as the first two characters of a proposed spelling correction, the INSERT algorithm can remain valid, i.e., within a canonical edit distance of one from the misspelled word "NAUSCUIT," only if the third letter that is received from the dictionary 42 can be found in the character set 116 that is associated with the character 112 of the data set 108 that immediately follows the character 112 "N", i.e., the character 112 "A". Similarly, the SWAP algorithm accepted the letter "A" as a first character of a proposed spelling correction on the basis that it was swapped with the character 112 "N" of the data set 108, and it accepted the letter "B" as a second character of a proposed spelling correction on the basis of it being equivalent to the swapped character 112 "N". In order for the SWAP algorithm to remain valid, therefore, the third letter received from the dictionary 42 must be found in the character set 116 associated with the third character 112 in the data set 108, i.e., the character 112 "U".

Accordingly, if the third letter received from the dictionary 42 is anything but the letter "A" or a character equivalent thereto, the INSERT algorithm will fail as requiring an invalid canonical edit distance of at least two from the misspelled word "NAUSCUIT", which would make the candidate spelling correction 122 "ABSCESS" invalid with respect to the INSERT algorithm. Similarly, if the third letter received from the dictionary 42 is anything other than the letter "U" or a character equivalent thereto, the SWAP algorithm will fail as requiring an invalid canonical edit distance of at least two from the misspelled word "NAUSCUIT", which would make the candidate spelling correction "ABSCESS" invalid with respect to the SWAP algorithm.

It is noted that the REPLACE and DELETE algorithms failed when the second letter, i.e., "B," was proposed by the dictionary 42 since the letter "B" could not be found in the character set 116 associated with the character 112 "A" of the data set 108 which was pointed to at that time by the REPLACE algorithm state 136. The DELETE algorithm failed because the second letter, i.e., "B," proposed by the dictionary 42 could not be found in the character set 116 associated with the character 112 "U" of the data set 108 which was pointed to at that time by the DELETE algorithm state 140.

As mentioned above, however, the INSERT and SWAP algorithms remain valid upon acceptance of the letter "B" of the candidate spelling correction. Upon proposal of the third letter "S" by the dictionary 42, however, the SWAP algorithm must fail because the letter "S" cannot be found in the character set 116 associated with the character "U" of the data set 108 and which is presently pointed to by the SWAP algorithm state 132. However, since the proposed third letter "S" from the dictionary 42 can be found in the character set 116 associated with the character 112 "A" in the data set 108 which is presently pointed to by the INSERT algorithm state 128, the letter "S" is accepted by the spell checking routine 44 as to the INSERT algorithm.

When the fourth letter "C" of the candidate spelling correction 122 "ABSCESS" is proposed by the dictionary 42, the INSERT algorithm is the only spell check algorithm that remains viable as to the candidate spelling correction 112 "ABSCESS." However, the proposed fourth letter "C" cannot be found in the character set 116 associated with the character 112 "U" in the data set 108 and to which the INSERT algorithm state 128 is currently pointing. As such, the fourth letter "C" proposed by the dictionary 42 fails and is not accepted by the spell checking routine 44. Rather, the candidate spelling correction 122 "ABSCESS" is rejected by the spell checking routine 44, and the dictionary 42 therefore continues searching throughout the words stored therein to identify another candidate spelling correction 122 for possible acceptance by the spell checking routine 44 in a fashion similar to that set forth above.

In the exemplary embodiment described herein, the dictionary 42 processes as candidate spelling corrections all of the words stored in current node which, in the example of the candidate spelling correction "ABSCESS" would be the "ABS" leaf node. For instance, the dictionary 42 would process all of the words beginning with "ABS" such as the words "ABSOLUTE" and "ABSTRACT" and the like as candidate spelling corrections.

As mentioned above, the spell checking algorithm 44 includes a RECALL feature which enables it to avoid some repetitious processing. For instance, in the above example the dictionary was processing the words at the "ABS" leaf node, which depends from the "AB" internal node. Since the letters "A" and "B" were accepted by the spell checking algorithm 44, if other words likewise depend from the "AB" internal node, such as might be stored in the "ABO" leaf node, it would be desirable to avoid repetition of the proposal and acceptance of the first two letters "A" and "B" between the dictionary 42 and the spell checking algorithm 44.

Accordingly, the dictionary 42 stores a pointer that points to the immediately previous node, and this previous node will be recalled once the end of the current node is reached. For instance, therefore, once the end of the "ABS" leaf node is reached, the dictionary 42 recalls the immediately prior node, which would be the internal node "AB", and the processing of further candidate spelling corrections begins from such prior node. That is, instead of asking the spell checking routine to again accept "A" and "B" as the first two characters of a proposed spelling correction, the dictionary recalls the prior internal node "AB" and begins to identify candidate spelling corrections from that point. For instance, the dictionary 42 might begin by asking the spell checking routine 44 if the letter "O" would be acceptable as a third character and, if it is accepted, by moving to the "ABO" leaf node and sending letters of the words stored at that location for acceptance by the spell checking routine 44. In such a situation, the spell checking routine would likewise recall the positions of its states 124, 128, 132, 136, and/or 140 at the time of acceptance of the second letter "B" in order to enable it to determine whether or not "O" would be acceptable as a third character by any of the spell check algorithms that are viable at that point. This advantageously saves time and reduced unnecessary duplicate processing.

After processing and exhausting the possible candidate spelling corrections 122 in the dictionary 42 that begin with the letter "A," the dictionary 42 might begin to propose candidate spelling corrections 122 that begin with the letter "B". For the sake of completeness, it is noted that in so doing the dictionary 42 may have retained the letter "B" as being part of the list of letters returned by the spell checking routine 44 in response to the aforementioned first callback operation. It is also noted in this regard that the dictionary 42 may have at this point repeated the aforementioned third callback operation, except this time the dictionary 42 would have requested from the spell checking routine 44 a list of letters that would be valid second letters given an acceptance of the letter "B" as a first character. As is further depicted as another example in FIG. 4, the dictionary 42 has identified the word "BASICALLY" as a candidate spelling correction 122 that will be proposed on a letter-by-letter basis to the spell checking routine 44.

As can be seen from the second example in FIG. 4, the first four letters "BASI" of the candidate spelling correction 122 "BASICALLY" were accepted at a canonical edit distance of zero by the spell checking routine, as is indicated by the changes to the zero edit distance state 224 in FIG. 4. In so doing, it is noted that in addition to its ability to maintain states for the four spell check algorithms, the spell checking routine 44 additionally saves the most recently proposed letter from the dictionary 42. If a current letter proposed by the dictionary 42 is identical or equivalent to the stored immediately preceding letter that was proposed by the dictionary 42, the current letter is implicitly accepted by the spell checking routine 44 without changing any of the stored states. Thereafter, the dictionary 42 would propose the next letter in the current candidate spelling correction 122. Therefore, in the example of the candidate spelling correction 122 "BASICALLY", the letters "B" and "A" were accepted by the spell checking routine as being at a canonical edit distance of zero from the first two characters of the misspelled word "NAUSCUIT". The third letter "S" of "BASICALLY" was accepted implicitly by the spell checking routine 44 as being equivalent to the immediately preceding letter "A" that was proposed by the dictionary 42. The fourth letter "I" of "BASICALLY" was accepted by the spell checking routine 44 at a canonical edit distance of zero from the misspelled word "NAUSCUIT" on the basis of the proposed letter "I" being found in the character set 116 associated with the third character 112 of the data set 108, i.e., the character 112 "U".

However, when the letter "C" of "BASICALLY" is proposed by the dictionary 42, the zero edit distance state 224 points to the character set 116 associated with the character "S" of the data set 108, and the letter "C" is not found in such character set 116. Therefore, the four spell check algorithms are consulted, and it is determined that all four spell check algorithms can accept the proposed letter "C" at a canonical edit distance of one from "NAUSCUIT". Upon the acceptance of "C", the INSERT algorithm state 228 and the SWAP algorithm state 232 are each pointing to the character set 116 associated with the character 112 "S" in the data set. The REPLACE algorithm state 236 is pointed to the character set 116 associated with the character 112 "C" of the data set, and the DELETE algorithm state 240 is pointing to the character set 116 associated with the collapsed characters 112 "UI" of the data set 108.

The sixth letter "A" of "BASICALLY" is accepted only by the INSERT and SWAP algorithms, and the REPLACE and DELETE algorithms fail. Thereafter, the proposal of the letter "L" of "BASICALLY" causes the INSERT and SWAP algorithms, i.e., the only remaining viable spell check algorithms, to fail. As such, the word "BASICALLY" is rejected by the spell checking routine 44 as a candidate spelling correction 122. The dictionary 42 thus is instructed to seek other words stored therein for possible proposal as candidate spelling corrections 122.

FIG. 4 further depicts how the word "BISCUIT" identified by the dictionary 42 as being a candidate spelling correction 122 matures into a proposed spelling correction 106 that is sent to the output file for possible output on the display 18. As mentioned above, the misspelled word "NAUSCUIT" resulted from the user seeking to type the word "BISCUIT" but with the unintentional insertion of an actuation of the <AS> key 28 between actuations of the <BN> key 28 and the <UI> key 28. It can be seen from FIG. 4 in the context of the word "BISCUIT" as a candidate spelling correction 122 that the letter "B" is accepted as being at a zero edit distance from "NAUSCUIT", as is indicated by the zero edit distance state 324. However, the second letter "I" of "BISCUIT" is accepted by the INSERT, SWAP, REPLACE, and DELETE algorithms at a canonical edit distance of one, as is indicated by the INSERT algorithm state 328, the SWAP algorithm state 332, the REPLACE algorithm state 336, and the DELETE algorithm state 340. The letter "S" is accepted on behalf of the INSERT, SWAP, and DELETE spell check algorithms, but it causes the REPLACE algorithm to fail. The letter "C" can be accepted only on behalf of the DELETE algorithm, with the INSERT and SWAP algorithms failing.

It can be seen from FIG. 4 that the DELETE algorithm remains viable, i.e., can accept additional letters while maintaining a canonical edit distance of one from the misspelled word "NAUSCUIT," through the acceptance of all of the letters of the word "BISCUIT". The continued viability of the DELETE algorithm in the present example makes logical sense since the word "BISCUIT" was misspelled as a result of an unintentional insertion of a keystroke <AS>. Therefore, a single deletion of the effect of the unintended keystroke <AS> results in the candidate spelling correction 122 "BISCUIT" maturing into a proposed spelling correction 106 and being stored for possible outputting on the display 18.

It thus can be seen that the generation of the canonical version of the misspelled word, i.e., the creation of the data set 108, alleviates the effect of incorrectly actuating a given key 28 too many sequential times during a text entry by collapsing adjacent equivalent characters into a single character set or data element. Similarly, the misspelling of words that by too few sequential actuation of a given key 28 is similarly alleviated by the storage by the spell checking routine 44 of the most recent proposed letter from the dictionary 42. As such, the canonical version of the misspelled word in combination with the implicit acceptance of letters that are equivalent to immediately preceding letters overcomes spelling errors that occur due to incorrect numbers of actuations of keys 28 during text entry. This is particularly advantageous in the context of a reduced keyboard since text entry on such a keypad oftentimes involves multiple sequential actuations of the same key 28.

Moreover, the canonical version of the misspelled word, i.e., the data set 108, enables a user to type words having diacritical forms of characters without having to expressly enter the diacritical marks, and the like, since diacritical and non-diacritical forms of characters are considered to be equivalent. That is, depending upon which language is active on the handheld electronic device 4, a user could type the non-diacritical forms of the characters of a diacritical word, and the spell checking routine 44 would identify the diacritical word as being a proposed spelling correction 106 on the basis of the equivalence between diacritical and non-diacritical forms of characters, as can be discerned from the keyboard mapping table 47.

The configuration of the spell checking routine 44 in conjunction with the dictionary 42 advantageously requires less processor effort than is required by other spell checking system since the spell checking routine 44 avoids the repetitive checking of certain portions of the dictionary 42 as a result of wild card searching. This processor savings is in addition to processor savings that results from the avoidance of certain repetitive processing by the RECALL feature mentioned above. For example, the use of wild card characters placed in various positions within a misspelled word can cause various portions of the dictionary 42 to be searched multiple times, such as when the wild card values are equal to the original values of the characters they are replacing. By causing the dictionary 42 to propose letters which can either be accepted or rejected by the spell checking routine 44, various searched portions of the dictionary 42 are searched only once, thereby avoiding the unnecessary consumption of processor resource.

Additionally, the spell checking routine 44 enables all four of the spell check algorithms to be evaluated more-or-less simultaneously with respect to each letter that is proposed by the dictionary 42. For instance, the spell checking routine 44 advantageously stores the state of each spell check algorithm to determine if, within a canonical edit distance of no more than one, each proposed letter from the dictionary 42 validly corresponds with a predetermined portion of the data set 108, as is indicated by the state of each spell check algorithm. If a spell check algorithm ceases to be viable, such as if a canonical edit distance of two was required to make the spell check algorithm viable, the spell check algorithm fails and is ignored or disregarded as future letter of the same candidate spelling correction 122 are proposed by the dictionary 42. As such, the data transfers between the dictionary 42 and the spell checking algorithm 44 occur only once for all four of the spell check algorithms, rather than requiring a separate data transfer for each spell check algorithm, thereby further reducing unnecessary consumption of processor resource.

As mentioned above, incorrect numbers of repetitions of keys and swaps between equivalent characters are not counted in determining a canonical edit distance, and the canonical edit distance is employed for the purpose of determining whether a candidate spelling correction in the dictionary 42 should be stored in an output file as a proposed spelling correction for possible outputting on the display 18. However, such incorrect numbers of repetitions of keys and swaps between equivalent characters are considered when calculating an actual edit distance, and the actual edit distance is employed in determining which of the proposed spelling corrections will be output on the display 18 and in what order.

Proposed spelling corrections are stored in an output file which automatically prioritizes each such received proposed spelling correction with respect to those already stored in the file. Any of a variety of criteria can be employed in determining priority. For example, proposed spelling corrections having a relatively small actual edit distance can be positioned in the output list at a higher priority than proposed spelling corrections having a relatively large actual edit distance. Other criteria may be additionally or alternatively employed. When operation of the spell checking routine 44 has been completed as to any misspelled word, a certain number of the proposed spelling corrections in the output file are displayed for selection by the user in order of decreasing priority.

Figure 5:
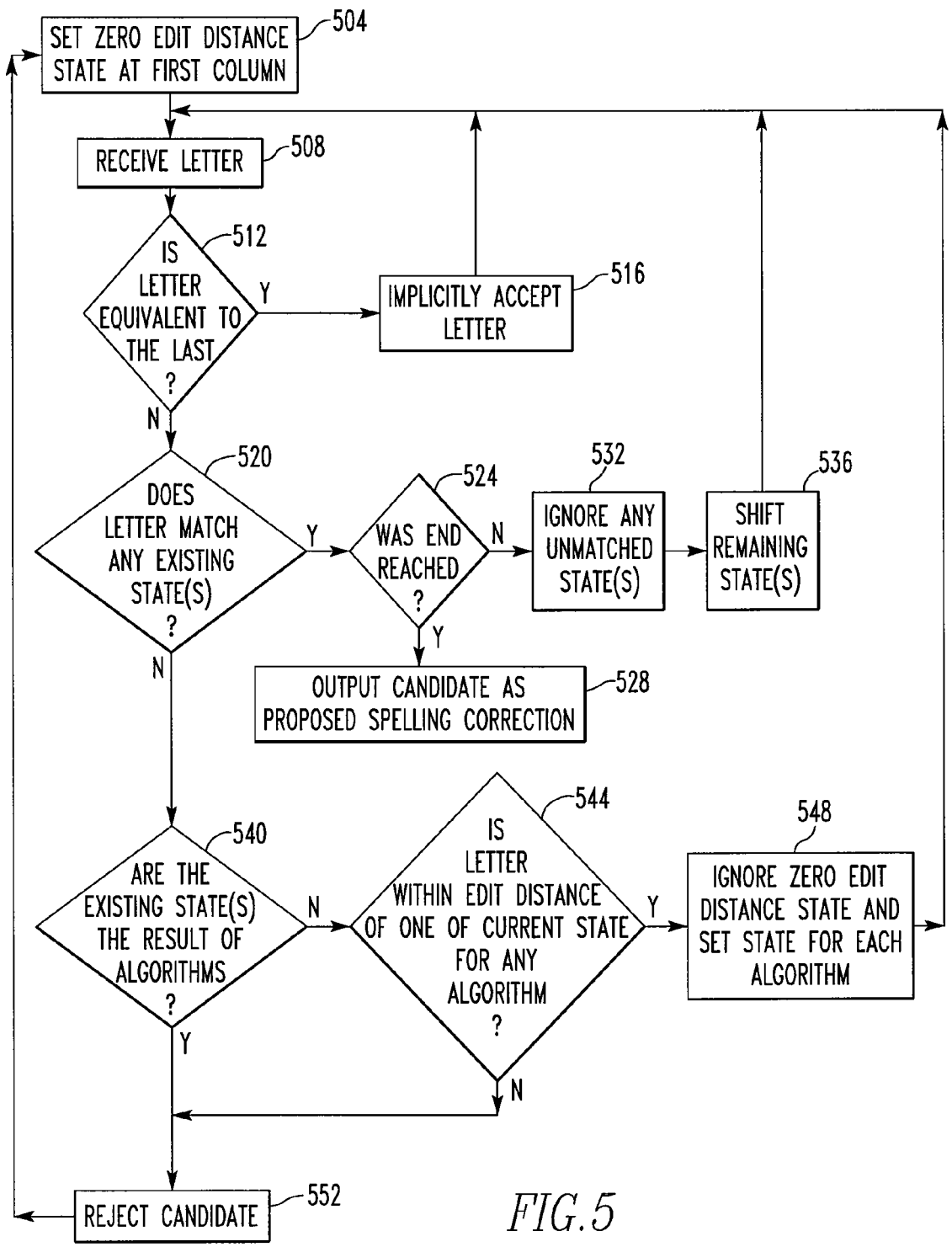
FIG. 5 is an exemplary flowchart depicting aspects of an improved method in accordance with the disclosed and claimed concept.

An improved method in accordance with the disclosed and claimed concept is depicted generally in FIG. 5. The flowchart depicts one exemplary way in which the concepts disclosed and claimed herein can be implemented, it being understood that other methodologies may be employed without departing from the present concept. It is reiterated that callback operations such as the first and third callback operations mentioned above are not expressly pointed out in the flowchart of FIG. 5, although it is understood that such callback operations might nevertheless occur.

Processing can be said to begin, as at 504, where a candidate spelling correction 122 is identified by the dictionary 42 and the spell checking routine 44 sets the zero edit distance state at the first character set 116, i.e., the leftmost column of the data set 108 that was generated for the misspelled word. The dictionary 42 thereafter proposes a letter of the candidate spelling correction 122, and the letter is received, as at 508, by the spell checking routine 44. It is then determined, as at 512, whether the current letter is equivalent to the most recently proposed letter from the dictionary 42. If the current letter is determined at 512 to be equivalent to the immediately preceding letter, the current letter is implicitly accepted, as at 516, without changing any of the stored states, and processing continues, as at 508, where additional letters that are proposed by the dictionary 42 can be received by the spell checking routine 44.

On the other hand, if it is determined, as at 512, that the current letter is not equivalent to the immediately preceding letter received from the dictionary 42, processing continues, as at 520, where it is determined whether the current letter matches any existing state that is maintained by the spell checking routine. This may include the zero edit distance state or the states of any of the four spell check algorithms, to the extent that such spell check algorithms remain viable and have not been ignored by the spell checking routine 44. If it is determined, as at 520, that the currently proposed letter matches at least one stored state, processing continues, as at 524, where it is determined whether the end of the candidate spelling correction 122 and the end of the data set 108 have been reached. If the end of both has been reached, processing continues, as at 528, where the candidate spelling correction 122 is stored in a file for eventual possible outputting as a proposed spelling correction 106.

However, if it is determined at 524 that the end has not been reached, processing will continue, as at 532, where any unmatched states are ignored or are set to a null value, and thereafter at 536 where the remaining states, i.e., those that were matched and therefore remain viable, are shifted as appropriate. Processing thereafter continues, as at 508, where additional letters can be received from the dictionary 42.

If it is determined, as at 520, that the currently proposed letter from the dictionary 42 does not match any of the existing states stored by the spell checking routine 44, processing continues, as at 540, where it is determined whether the existing states are the result of the spell check algorithms. That is, it is essentially determined at 540 whether the zero edit distance state 124 was the only existing state at 520. If so, this would indicate that the letters that have been accepted by the spell checking routine 44 have all been within an edit distance of zero of the misspelled word. If the current states are not the result of the spell check algorithms, this would suggest, in turn, that all of the spell check algorithms are viable and can be used to accept the currently proposed letter as long as the currently proposed letter is within an edit distance of one for an algorithm from the current state.

If it is determined, as at 544, that at least one of the spell check algorithms can accept the currently proposed letter within an edit distance of one, processing continues, as at 548, where the zero edit distance state is ignored and states are set for each viable spell check algorithm, i.e., each spell check algorithm that was able to accept the current letter within an edit distance of one. Processing would thereafter continue, as at 508, where additional letters can be received from the dictionary 42.

On the other hand, if it is determined, as at 540, that the existing states were the result of the spell check algorithms, this would indicate that the accepted letters of the candidate spelling correction 122 were already at an edit distance of one from the misspelled word according to all of the spell check algorithms. In such a situation, an inability to further match, as at 520, an additional letter to the spell check algorithms would indicate that all of the spell check algorithms are invalid, i.e., would require an edit distance of two or more, which would cause the spell check algorithms to fail. As such, the candidate spelling correction 122 would be rejected, as at 522. Thereafter, the dictionary 42 would be instructed to identify another word as being another candidate spelling correction 122 for processing by the spell checking routine 44. Processing would thereafter return, as at 504, where the new candidate spelling correction 122 could be evaluated by the spell checking routine 44.

While the spell checking routine 44 is described above in detail in conjunction with a reduced keyboard, i.e., the keypad 24, it is understood that the spell checking routine 44 could also be advantageously implemented on a device that employs a full keyboard. For example, the user may have intended to type the word "falling" but had instead typed "feling", i.e., the user had typed an "E" instead of an "A" and had typed a single "L" instead of a double "L". The spell checking routine 44 would determine that the word was misspelled and would generate a canonical version of the misspelled word by generating a canonicalized form thereof, i.e., <F><E><L><I><N><G>, and by generating for each data element a corresponding character set. For example, the character set for the data element <E> would include the non-diacritical "e" and "E" as well as all diacritical forms thereof.

The spell checking routine 44 would employ the methodology set forth above to identify as a proposed spelling correction the word "falling" on the basis of the REPLACE spell check algorithm replacing the letter "E" with the letter "A" at a canonical edit distance of one and with the additional "L" being accepted without affecting the canonical edit distance. While the proposed spelling correction "falling" has an actual edit distance of two from the misspelled word "feling", the canonical edit distance therebetween is an edit distance of one. The spell checking routine 44 would similarly identify as another proposed spelling correction the word "feelings" at a canonical edit distance of one and an actual edit distance of two, for example. These two words would be identified and potentially output by the spell checking routine 44 despite having an actual edit distance of two. The spell checking routine 44 can thus be said in the context of a full keyboard to provide better spelling corrections than spell check engines that identify and output only those words within an actual edit distance of one from a misspelled word.

It is noted that additional benefits are provided by the multiple-axis input device mentioned above. For instance, an exemplary home screen output 1060 that can be visually output on the display 18 is depicted in FIG. 6 as including a plurality of icons 1062 that are selectable by the user for the purpose of, for example, initiating the execution on the processor apparatus 16 of a routine that is represented by an icon 1062. The track ball 32 is rotatable to provide, for example, navigational inputs among the icons 1062.

For example, FIG. 6 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 18, but rather are intended to together depict a series of situations and to indicate movement of the indicator 1066 among the icons 1062. The particular location of the indicator 1066 at any given time indicates to a user the particular icon 1062, for example, that is the subject of a selection focus of the handheld electronic device 4. Whenever an icon 1062 or other selectable object is the subject of the selection focus, a selection input to the processor apparatus 16 will result in execution or initiation of the routine or other function that is represented by the icon 1062 or other selectable object.

The movement of the indicator 1066 from the icon 1062A, as indicated with the indicator 1066A, to the icon 1062B, as is indicated by the indicator 1066B, was accomplished by rotating the track ball 32 about the vertical axis 34B to provide a horizontal navigational input. As mentioned above, a rotation of the track ball 32 a predetermined rotational distance results in an input to the processor apparatus 16. In the present example, the track ball 32 would have been rotated about the vertical axis 34B a rotational distance equal to three times the predetermined rotational distance since the icon 62B is disposed three icons 1062 to the right the icon 1062A. Such rotation of the track ball 32 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the track ball 32 about the horizontal axis 34A to provide a vertical navigational input. In so doing, the track ball 32 would have been rotated a rotational distance equal to two times the predetermined rotational distance since the icon 1062C is disposed two icons 1062 below the icon 1062B. Such rotation of the track ball 32 likely would have been made in a single motion by the user, but this need not necessarily be the case.

It thus can be seen that the track ball 32 is rotatable in various directions to provide various navigational and other inputs to the processor apparatus 16. Rotational inputs by the track ball 32 typically are interpreted by whichever routine is active on the handheld electronic device 4 as inputs that can be employed by such routine. For example, the GUI 46 that is active on the handheld electronic device 4 in FIG. 6 requires vertical and horizontal navigational inputs to move the indicator 1066, and thus the selection focus, among the icons 1062. If a user rotated the track ball 32 about an axis oblique to the horizontal axis 34A and the vertical axis 34B, the GUI 46 likely would resolve such an oblique rotation of the track ball 32 into vertical and horizontal components which could then be interpreted by the GUI 46 as vertical and horizontal navigational movements, respectively. In such a situation, if one of the resolved vertical and horizontal navigational movements is of a greater magnitude than the other, the resolved navigational movement having the greater magnitude would be employed by the GUI 46 as a navigational input in that direction to move the indicator 1066 and the selection focus, and the other resolved navigational movement would be ignored by the GUI 46, for example.

When the indicator 1066 is disposed on the icon 1062C, as is indicated by the indicator 1066C, the selection focus of the handheld electronic device 4 is on the icon 1062C. As such, a translation of the track ball 32 toward the housing 6 as described above would provide an input to the processor apparatus 16 that would be interpreted by the GUI 46 as a selection input with respect to the icon 1062C. In response to such a selection input, the processor apparatus 16 would, for example, begin to execute a routine that is represented by the icon 1062C. It thus can be understood that the track ball 32 is rotatable to provide navigational and other inputs in multiple directions, assuming that the routine that is currently active on the handheld electronic device 4 can employ such navigational or other inputs in a plurality of directions, and can also be translated to provide a selection input or other input.

As mentioned above, FIG. 7 depicts an exemplary menu 1035A that would be appropriate if the user's current logical location within the logical menu tree was viewing an email within an email routine. That is, the menu 1035A provides selectable options that would be appropriate for a user given that the user is, for example, viewing an email within an email routine. In a similar fashion, FIG. 8 depicts another exemplary menu 1035B that would be depicted if the user's current logical location within the logical menu tree was within a telephone routine.

Rotational movement inputs from the track ball 32 could be employed to navigate among, for example, the menus 1035A and 1035B. For instance, after an actuation of the <MENU> key 33 and an outputting by the GUI 46 of a resultant menu, the user could rotate the track ball 32 to provide scrolling inputs to successively highlight the various selectable options within the menu. Once the desired selectable option is highlighted, i.e., is the subject of the selection focus, the user could translate the track ball 32 toward the housing 6 to provide a selection input as to the highlighted selectable option. In this regard, it is noted that the <MENU> key 33 is advantageously disposed adjacent the track ball 32. This enables, for instance, the generation of a menu by an actuation the <MENU> key 33, conveniently followed by a rotation the track ball 32 to highlight a desired selectable option, for instance, followed by a translation of the track ball 32 toward the housing 6 to provide a selection input to initiate the operation represented by the highlighted selectable option.

It is further noted that one of the additional inputs that can be provided by a translation of the track ball 32 is an input that causes the GUI 46 to output a reduced menu. For instance, a translation of the track ball 32 toward the housing 6 could result in the generation and output of a more limited version of a menu than would have been generated if the <MENU> key 33 had instead been actuated. Such a reduced menu would therefore be appropriate to the user's current logical location within the logical menu tree and would provide those selectable options which the user would have a high likelihood of selecting. Rotational movements of the track ball 32 could provide scrolling inputs to scroll among the selectable options within the reduced menu 1035C, and translation movements of the track ball 32 could provide selection inputs to initiate whatever function is represented by the selectable option within the reduce menu 1035C that is currently highlighted.

By way of example, if instead of actuating the <MENU> key 33 to generate the menu 1035A the user translated the track ball 32, the GUI 46 would generate and output on the display the reduced menu 1035C that is depicted generally in FIG. 9. The exemplary reduced menu 1035C provides as selectable options a number of the selectable options from the menu 1035A that the user would be most likely to select. As such, a user seeking to perform a relatively routine function could, instead of actuating the <MENU> key 33 to display the full menu 1035A, translate the track ball 32 to generate and output the reduced menu 1035C. The user could then conveniently rotate the track ball 32 to provide scrolling inputs to highlight a desired selectable option, and could then translate the track ball 32 to provide a selection input which would initiate the function represented by the selectable option in the reduced menu 1035C that is currently highlighted.

In the present exemplary embodiment, many of the menus that could be generated as a result of an actuation of the <MENU> key 33 could instead be generated and output in reduced form as a reduced menu in response to a translation of the track ball 32 toward the housing 6. It is noted, however, that a reduced menu might not be available for each full menu that could be generated from an actuation of the <MENU> key 33. Depending upon the user's specific logical location within the logical menu tree, a translation of the track ball 32 might be interpreted as a selection input rather than an input seeking a reduced menu. For instance, a translation of the track ball 32 on the home screen depicted in FIG. 1 would result in a selection input as to whichever of the icons 1062 is the subject of the input focus. If the <MENU> key 33 was actuated on the home screen, the GUI 46 would output a menu appropriate to the home screen, such as a full menu of all of the functions that are available on the handheld electronic device 4, including those that might not be represented by icons 1062 on the home screen.

Figure 10:
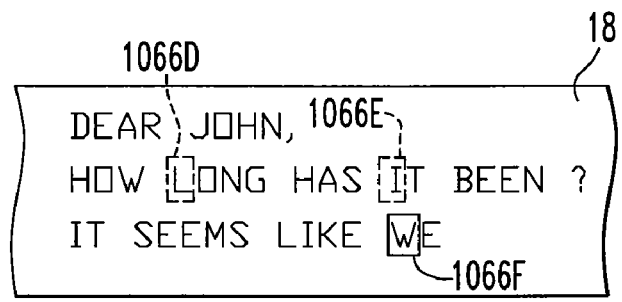
FIG. 10 is an output such as could occur during another exemplary text entry or text editing operation.

FIG. 10 depicts a quantity of text that is output on the display 18, such as during a text entry operation or during a text editing operation, for example. The indicator 1066 is depicted in FIG. 10 as being initially over the letter "L", as is indicated with the indicator 1066D, and having been moved horizontally to the letter "I", as is indicated by the indicator 1066E, and thereafter vertically moved to the letter "W", as is indicated by the indicator 1066F. In a fashion similar to that in FIG. 6, the cursor 1066 was moved among the letters "L", "I", and "W" through the use of horizontal and vertical navigational inputs resulting from rotations of the track ball 32. In the example of FIG. 10, however, each rotation of the track ball 32 the predetermined rotational distance would move the indicator 1066 to the next adjacent letter. As such, in moving the indicator 1066 between the letters "L" and "I," the user would have rotated the track ball 32 about the vertical axis 1034B a rotational distance equal to nine times the predetermined rotational distance, for example, since "I" is disposed nine letters to the right of "L".

Figure 11:
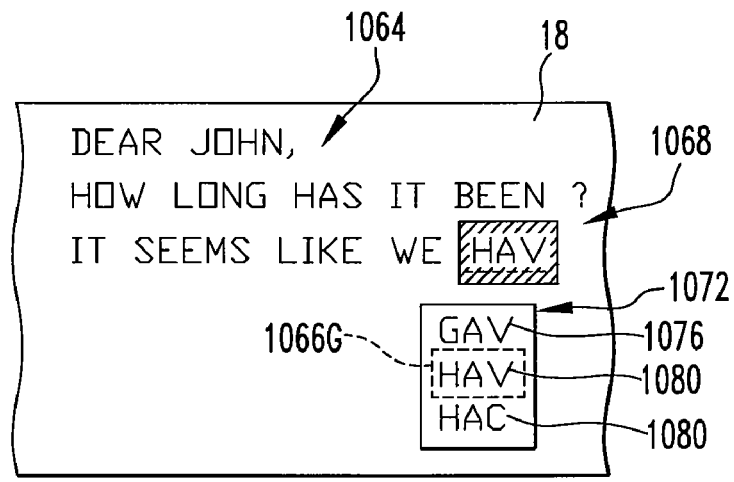
FIG. 11 is an output during another exemplary text entry operation.

FIG. 11 depicts an output 1064 on the display 18 during, for example, a text entry operation that employs the disambiguation routine 45. The output 1064 can be said to comprise a text component 1068 and a variant component 1072. The variant component 1072 comprises a default portion 1076 and a variant portion 1080. FIG. 11 depicts the indicator 1066G on the variant 1080 "HAV", such as would result from a rotation of the track ball 32 about the horizontal axis 34A to provide a downward vertical scrolling input. In this regard, it is understood that a rotation of the track ball 32 a distance equal to the predetermined rotational distance would have moved the indicator 1066 from a position (not expressly depicted herein) disposed on the default portion 1076 to the position disposed on the first variant 1080, as is depicted in FIG. 11. Since such a rotation of the track ball 32 resulted in the first variant 1080 "HAV" being highlighted with the indicator 1066G, the text component 1068 likewise includes the text "HAV" immediately preceding a cursor 1084A.

Figure 12:
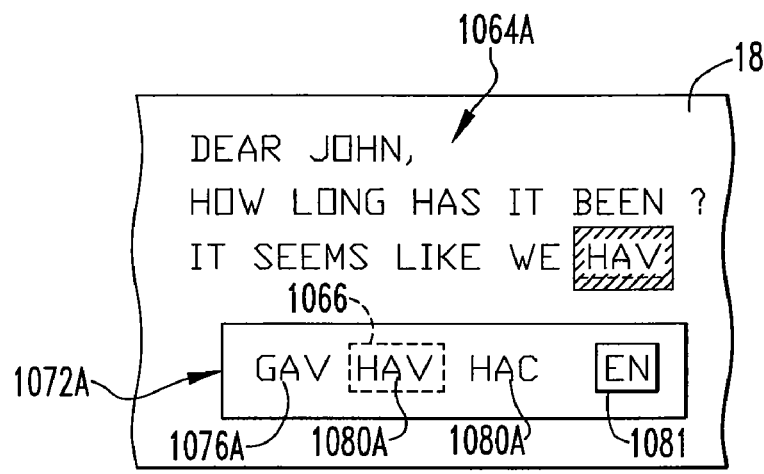
FIG. 12 is an alternative output during the exemplary text entry operation of FIG. 11.

FIG. 12 depict an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the track ball 32 the predetermined rotational distance about the vertical axis 34B. This is to be contrasted with the variant component 1072 of FIG. 11 wherein the default portion 1076 and the variants 1080 are vertically arranged, and which can be sequentially selected by the user through the user of vertical scrolling inputs with the track ball 32.

In this regard, it can be understood that the track ball 32 can provide both the vertical scrolling inputs employed in conjunction with the output 1064 as well as the horizontal scrolling inputs employed in conjunction with the output 1064A. For instance, the disambiguation routine 45 potentially could allow the user to customize the operation thereof by electing between the vertically arranged variant component 1072 and the horizontally arranged variant component 1072A. The track ball 32 can provide scrolling inputs in the vertical direction and/or the horizontal direction, as needed, and thus is operable to provide appropriate scrolling inputs regardless of whether the user chooses the variant component 1072 or the variant component 1072A. That is, the track ball 32 can be rotated about the horizontal axis 34A to provide the vertical scrolling inputs employed in conjunction with the variant component 1072, and also can be rotated about the vertical axis 34B to provide the horizontal scrolling inputs that are employed in conjunction with the variant component 1064A. The track ball 32 thus could provide appropriate navigational, strolling, selection, and other inputs depending upon the needs of the routine active at any time on the handheld electronic device 4. The track ball 32 enables such navigational, strolling, selection, and other inputs to be intuitively generated by the user through rotations of the track ball 32 in directions appropriate to the active routine, such as might be indicated on the display 18.

It can further be seen from FIG. 12 that the variant component 1072A additionally includes a value 1081 that is indicative of the language into which the disambiguation routine 45 will interpret ambiguous text input. In the example depicted in FIG. 12, the language is English, as is the language in FIG. 1.

Figure 13:
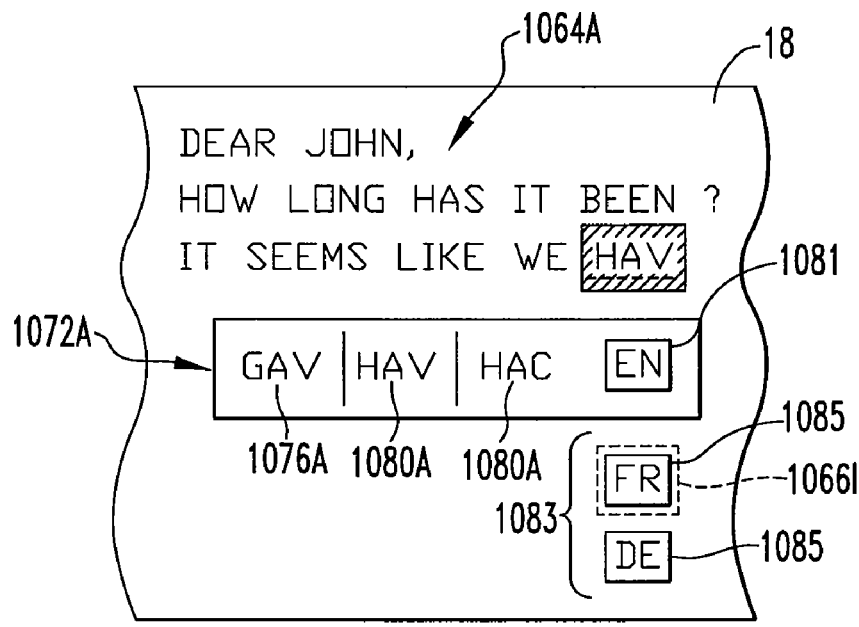
FIG. 13 is another output during another part of the exemplary text entry operation of FIG. 11.

As can be seen in FIG. 13, the value 1081 can be selected by the user to cause the displaying of a list 1083 of alternative values 1085. The alternative values 1085 are indicative of selectable alternative languages into which the disambiguation routine 45 can interpret ambiguous input. A selection of the value 1081 would have been achieved, for example, by the user providing horizontal scrolling inputs with the track ball 32 to cause (not expressly depicted herein) the indicator 1066 to be disposed over the value 1081, and by thereafter translating the track ball 32 toward the housing 6 to provide a selection input.

The alternative values 1085 in the list 1083 are vertically arranged with respect to one another and with respect to the value 1081. As such, a vertical scrolling input with the track ball 32 can result in a vertical movement of the indicator 10661 to a position on one of the alternative values 1085 which, in the present example, is the alternative value 1085 "FR", which is representative of the French language and, more specifically, refers to the French dictionary of the dictionary 42. The alternative value 1085 "FR" could become selected by the user in any of a variety of fashions, such as by actuating the track ball 32 again, by continuing to enter text, or in other fashions. It thus can be understood from FIG. 12 and FIG. 13 that the track ball 32 can be rotated to provide horizontal scrolling inputs and, when appropriate, to additionally provide vertical scrolling inputs and, when appropriate, to additionally provide selection inputs, for example.

Figure 14:
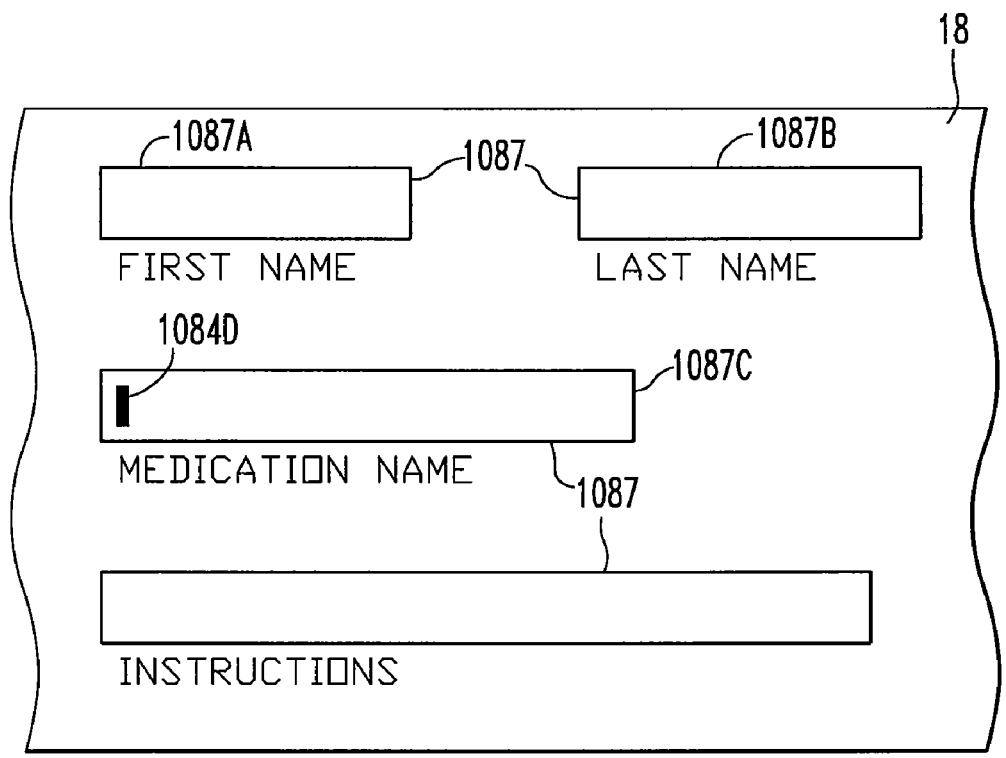
FIG. 14 is an exemplary output during a data entry operation.

FIG. 14 depicts another exemplary output on the display 18 such as might be employed by a data entry routine. The exemplary output of FIG. 14 comprises a plurality of input fields 1087 with corresponding descriptions. A cursor 1084D, when disposed within one of the input fields 1087, indicates to the user that an input focus of the handheld electronic device 4 is on that input field 1087. That is, data such as text, numbers, symbols, and the like, will be entered into whichever input field 1087 is active, i.e., is the subject of the input focus. It is understood that the handheld electronic device 4 might perform other operations or take other actions depending upon which input field 1087 is the subject of the input focus.

Navigational inputs from the track ball 32 advantageously enable the cursor 1084D, and thus the input focus, to be switched, i.e., shifted, among the various input fields 1087. For example, the input fields 1087 could include the input fields 1087A, 1087B, and 1087C. FIG. 14 depicts the cursor 1084D as being disposed in the input field 1087C, indicating that the input field 1087C is the subject of the input focus of the handheld electronic device 4. It is understood that the cursor 1084D, and thus the input focus, can be shifted from the input field 1087C to the input field 1087A, which is disposed adjacent and vertically above the input field 1087C, by providing a vertical scrolling input in the upward direction with the track ball 32. That is, the track ball 32 would be rotated the predetermined rotational distance about the horizontal axis 34. Similarly, the cursor 1084D, and thus the input focus, can be shifted from the input field 1087A to the input field 1087B, which is disposed adjacent and to the right of the input field 1087A, by providing a horizontal scrolling input to the right with the track ball 32. That is, such a horizontal scrolling input could be provided by rotating the track ball the predetermined rotational distance about the vertical axis 34B. It thus can be seen that the track ball 32 is rotatable in a plurality of directions about a plurality axes to provide navigational, scrolling, and other inputs in a plurality of directions among a plurality of input fields 1087. Other types of inputs and/or inputs in other applications will be apparent.

Figure 15:
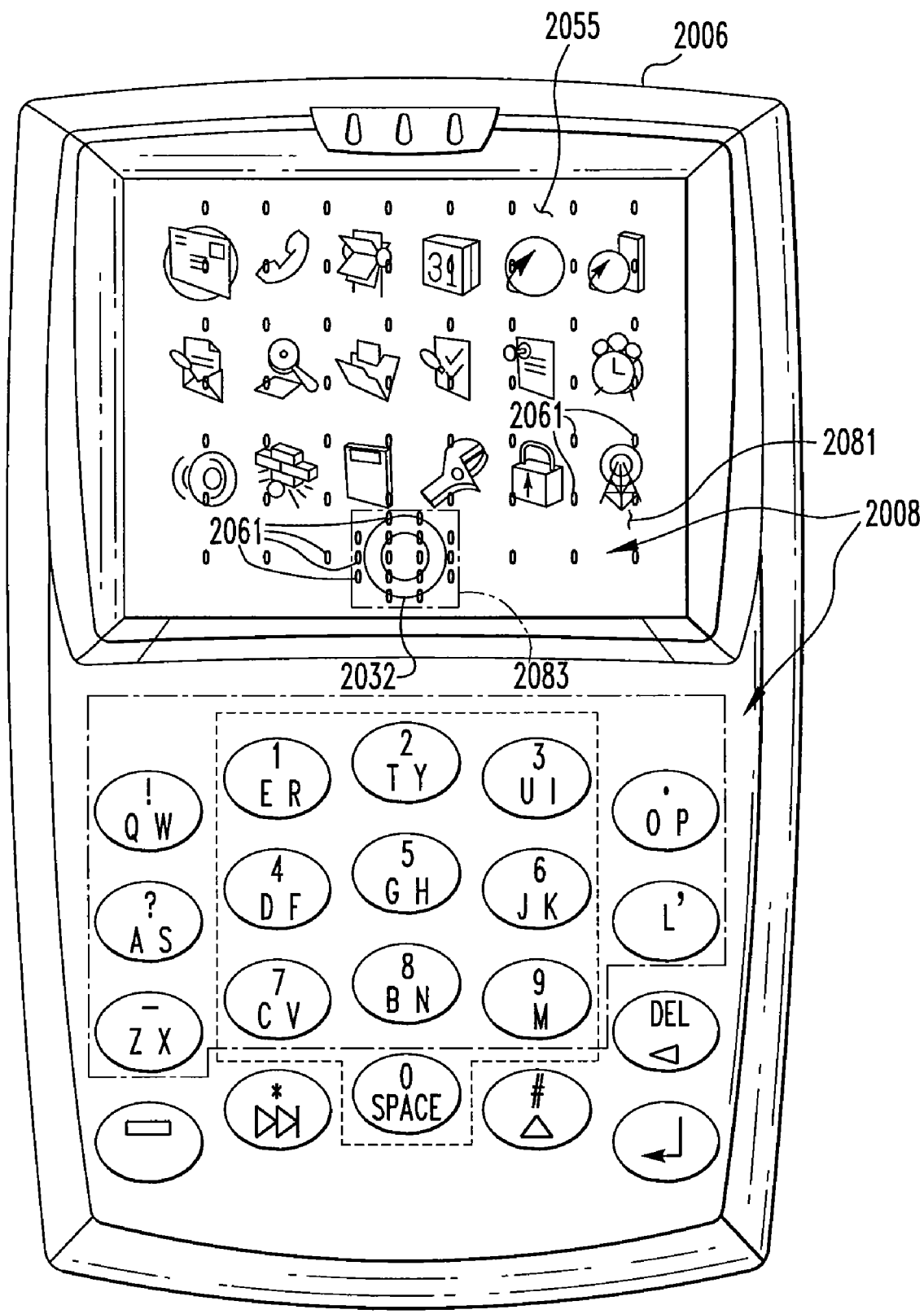
FIG. 15 is a top plan view of an improved handheld electronic device in accordance with another embodiment of the disclosed and claimed concept.
Figure 16:
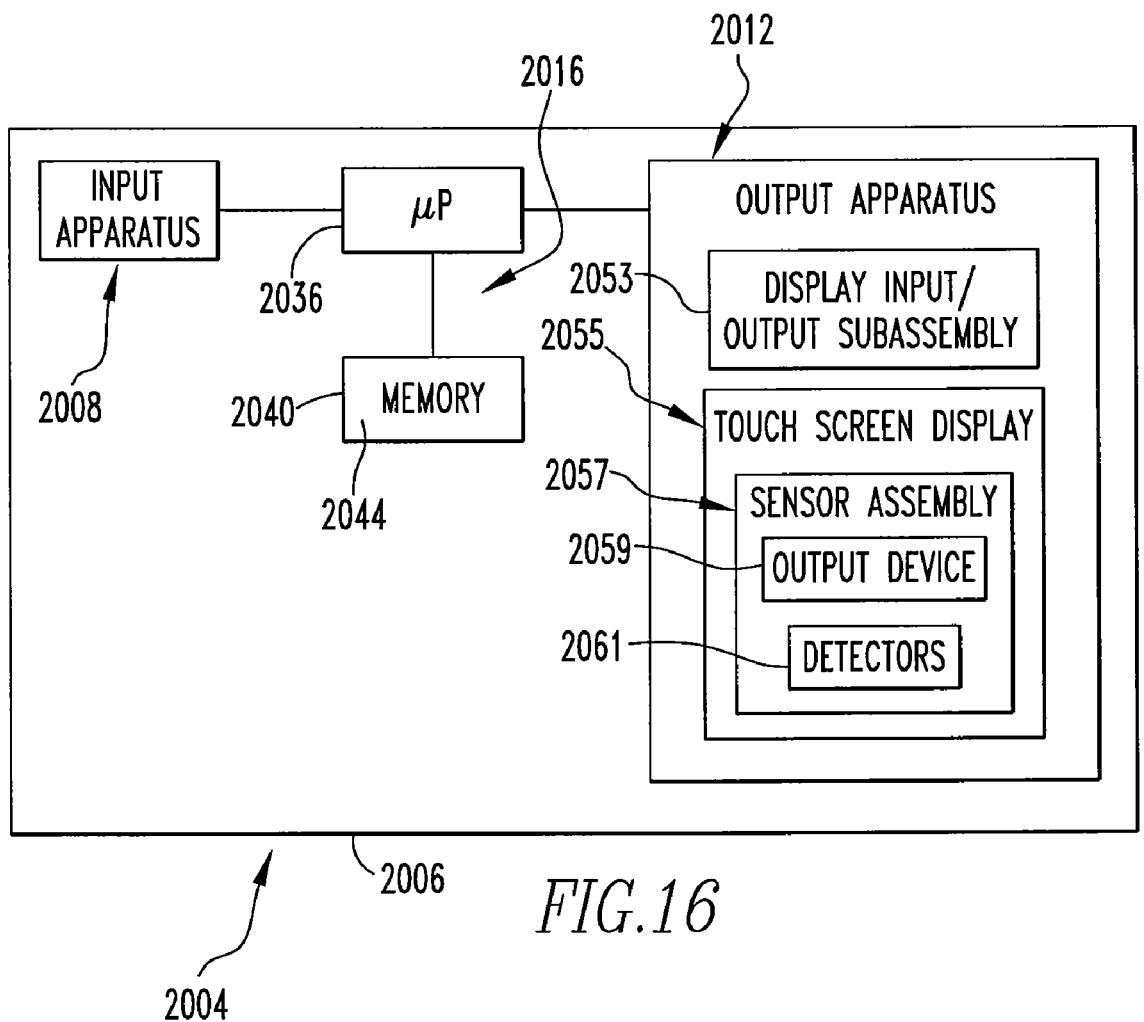
FIG. 16 is a schematic depiction of the improved handheld electronic device of FIG. 15.

An improved handheld electronic device 2004 in accordance with still another embodiment of the disclosed and claimed concept is depicted generally in FIG. 15 and FIG. 16. The handheld electronic device 2004 includes a housing 2006 upon which are disposed an input apparatus 2008, an output apparatus 2012, and a processor apparatus 2016. The processor apparatus 2016 comprises a processor 2036 a memory 2040 having stored therein a number of routines 2044. All of the operations that can be performed on or with the handheld electronic device 4 can be performed on or with the handheld electronic device 2004. As such, the features of the handheld electronic device 2004 that are common with the handheld electronic device 4, and this would comprise essentially all of the features of the handheld electronic device 4, will generally not be repeated.

As a general matter, the handheld electronic device 2004 is substantially identical in configuration and function to the handheld electronic device 4, except that the handheld electronic device 2004 includes a touch screen display 2055 that provides a non-mechanical multiple-axis input device 2032 instead of the track ball 32. The non-mechanical multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 15, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual track ball 2032 in the second area 2083 of the touch screen display 2055. Thus, actuations of one or more of the detectors 2061 that support the virtual track ball 2032 will be interpreted by the processor apparatus as being inputs from the virtual track ball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 could be interpreted by the processor apparatus as an actuation input of the virtual track ball 2032, such as would be generated by an actuation of the track ball 32 of the handheld electronic device 1004 in a direction toward the housing 1006 thereof. It can be understood that other types of actuations of the detectors 2061 in the second area 2083 can be interpreted as various other inputs without departing from the disclosed and claimed concept.

The handheld electronic device 2004 thus comprises a multiple-axis input device 2032 that is non-mechanical but that still provides the same functional features and advantages as, say, the track ball 32 of the handheld electronic device 4. It is understood that the virtual track ball 2032 is but one example of the many types of multiple-axis input devices that could be employed on the handheld electronic device 2004.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of identifying a proposed spelling correction for a word that has been determined to at least potentially be misspelled, the method comprising:
   receiving from a data source a series of characters of a candidate spelling correction;
   making a determination for each character of at least a portion of the series that at least one of:
      the character validly corresponds with a predetermined portion of a canonical version of the word, and
      the character is, according to at least one spell check algorithm from among a number of spell check algorithms, within a predetermined edit distance from a predetermined portion of the canonical version of the word; and
   outputting at least a portion of the candidate spelling correction as a proposed spelling correction,
   wherein the canonical version of the word includes a character set having both diacritical and non-diacritical forms of at least one character.

2. The method of claim 1, further comprising determining that a particular character of the series is equivalent to an immediately preceding character of the series and, responsive thereto, considering the particular character to validly correspond with a predetermined portion of the canonical version of the word.

3. The method of claim 1 wherein the predetermined edit distance is an edit distance of one, and further comprising determining for at most one character of the series that the character is, according to the spell check algorithm, within an edit distance of one from a predetermined portion of the canonical version of the word.

4. The method of claim 1 wherein the predetermined edit distance is an edit distance of one, and further comprising:
determining that one character of the series fails to validly correspond with a predetermined portion of the canonical version of the word but is, according to another spell check algorithm from among the number of spell check algorithms, within an edit distance of one from a predetermined portion of the canonical version of the word;
determining that another character of the series received subsequent to the one character fails to validly correspond with a predetermined portion of the canonical version of the word; and
disregarding the another spell check algorithm as characters in the series are received subsequent to the another character.

5. The method of claim 1, further comprising:
generating a data set including, for each character of a canonicalized form of the word, a character set comprising the characters that are equivalent thereto, and employing the data set as the canonical version of the word.

6. The method of claim 5, further comprising:
as at least a portion the making of the determination:
determining that one of the characters of the series fails to validly correspond with a predetermined portion of the data set, the one of the characters being the first character in the series to fail to validly correspond with a predetermined portion of the data set, and
for each spell check algorithm of at least some of the number of spell check algorithms:
determining that the one of the characters is within a predetermined edit distance from a predetermined portion of the data set, and
storing a representation of a character set of the data set as a state of the spell check algorithm; and
for each character of at least some of the characters of the series received subsequent to the one of the characters, determining for each spell check algorithm of at least some of the number of spell check algorithms that the character validly corresponds with at least one of the characters in the character set represented by the state of the spell check algorithm and responsively changing the state of the spell check algorithm to be representative of another character set of the data set.

7. The method of claim 6, further comprising:
determining that a particular character of the series received subsequent to the one of the characters fails to validly correspond with any of the characters in the character set represented by the state of at least one spell check algorithm; and
disregarding the at least one spell check algorithm as characters in the series are received subsequent to the particular character.

8. The method of claim 1, wherein the character of the canonicalized form of the word and an alternate character are both assigned to a predetermined input member, and further comprising:
generating as the character set for the character of the canonicalized form of the word a character set further comprising both diacritical and non-diacritical forms of the alternate character.

9. The method of claim 8, further comprising:
generating as the character set for the character of the canonicalized form of the word a character set further comprising both upper case and lower case forms of the character and the alternate character.

10. The method of claim 1, further comprising:
outputting a proposed spelling correction differing from the misspelled word at most by replacements of characters with equivalent characters and resolutions of incorrect numbers of sequential actuations of particular keys at a position of priority with respect to a proposed spelling correction differing from the misspelled word by an INSERT, a SWAP, a REPLACE, or a DELETE operation with respect to a nonequivalent character.

11. The method of claim 1 wherein the data source is a first language dictionary and wherein the first language is an operative language, and further comprising:
detecting a selection of an alternate language dictionary and, responsive thereto, changing the operative language to be the alternate language.

12. A handheld electronic device structured to identify a proposed spelling correction for a word that has been determined to at least potentially be misspelled, the handheld electronic device comprising:
a processor apparatus comprising a processor and a memory and having available thereto a data source comprising a plurality of words;
an input apparatus structured to provide input to the processor apparatus, the input apparatus comprising a plurality of input member, at least some of the input members each having a plurality of characters assigned thereto;
an output apparatus structured to receive output signals from the processor apparatus;
the memory having stored therein a number of routines which, when executed on the processor, cause the handheld electronic device to perform operations comprising:
receiving from a data source a series of characters of a candidate spelling correction;
making a determination for each character of at least a portion of the series that at least one of:
the character validly corresponds with a predetermined portion of a canonical version of the word, and
the character is, according to at least one spell check algorithm from among a number of spell check algorithms, within a predetermined edit distance from a predetermined portion of the canonical version of the word;
determining for one character of the series that the character is, according to the at least one spell check algorithm, within an edit distance of one from a predetermined portion of the canonical version of the word; and
outputting at least a portion of the candidate spelling correction as a proposed spelling correction.

13. The handheld electronic device of claim 12 wherein the operations further comprise:
determining that a particular character of the series is equivalent to an immediately preceding character of the series, and
responsive to the determining, considering the particular character to validly correspond with a predetermined portion of the canonical version of the word.

14. The handheld electronic device of claim 12 wherein the predetermined edit distance is an edit distance of one.

15. The handheld electronic device of claim 12 wherein the predetermined edit distance is an edit distance of one, and wherein the operations further comprise:
determining that one character of the series fails to validly correspond with a predetermined portion of the canonical version of the word but is, according to another spell check algorithm from among the number of spell check algorithms, within an edit distance of one from a predetermined portion of the canonical version of the word;

determining that another character of the series received subsequent to the one character fails to validly correspond with a predetermined portion of the canonical version of the word; and disregarding the another spell check algorithm as characters in the series are received subsequent to the another character.

16. The handheld electronic device of claim 12 wherein the operations further comprise:

generating a data set comprising for each character of a canonicalized form of the word a character set comprising the characters that are equivalent thereto, and employing the data set as the canonical version of the word.

17. The handheld electronic device of claim 16 wherein the operations further comprise:

as at least a portion the making of the determination:

determining that one of the characters of the series fails to validly correspond with a predetermined portion of the data set, the one of the characters being the first character in the series to fail to validly correspond with a predetermined portion of the data set, and for each spell check algorithm of at least some of the number of spell check algorithms:

determining that the one of the characters is within a predetermined edit distance from a predetermined portion of the data set, and storing a representation of a character set of the data set as a state of the spell check algorithm; and for each character of at least some of the characters of the series received subsequent to the one of the characters, determining for each spell check algorithm of at least some of the number of spell check algorithms that the character validly corresponds with at least one of the characters in the character set represented by the state of the spell check algorithm and responsively changing the state of the spell check algorithm to be representative of another character set of the data set.

18. The handheld electronic device of claim 17 wherein the operations further comprise:

determining that a particular character of the series received subsequent to the one of the characters fails to validly correspond with any of the characters in the character set represented by the state of at least one spell check algorithm; and disregarding the at least one spell check algorithm as characters in the series are received subsequent to the particular character.

19. The handheld electronic device of claim 16 wherein the operations further comprise:

generating as the character set for a character of the canonicalized form of the word a character set comprising both diacritical and non-diacritical forms of the character.

20. The handheld electronic device of claim 19 wherein the character of the canonicalized form of the word and an alternate character are both assigned to a predetermined input member, and wherein the operations further comprise:

generating as the character set for the character of the canonicalized form of the word a character set further comprising both diacritical and non-diacritical forms of the alternate character.

* * * * *